US012665995B2

(12) United States Patent (10) Patent No.: US 12,665,995 B2
Graae et al. (45) Date of Patent: Jun. 23, 2026

(54) PROJECTING IMAGES ON A SPHERICAL VENUE

(71) Applicant: Sphere Entertainment Group, LLC, New York, NY (US)

(72) Inventors: Michael Graae, Brooklyn, NY (US); Deanan Dasilva, Malibu, CA (US); Andrew Cochrane, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 275 days.

(21) Appl. No.: 18/349,323

(22) Filed: Jul. 10, 2023

(65) Prior Publication Data

US 2024/0214535 A1 Jun. 27, 2024

Related U.S. Application Data

(60) Provisional application No. 63/434,366, filed on Dec. 21, 2022.

(51) Int. Cl.
H04N 13/111 (2018.01)
H04N 13/15 (2018.01)
(Continued)

(52) U.S. Cl.
CPC ........... H04N 13/111 (2018.05); H04N 13/15 (2018.05); H04N 13/167 (2018.05); H04N 13/395 (2018.05)

(58) Field of Classification Search
CPC .... H04N 13/111; H04N 13/395; H04N 13/15; H04N 13/167
See application file for complete search history.

(56) References Cited

U.S. PATENT DOCUMENTS 3,971,065 A 7/1976 Bayer
5,900,982 A * 5/1999 Dolgoff ................ H04N 9/3167
348/E13.058

(Continued)

FOREIGN PATENT DOCUMENTS

JP 2002026304 A 1/2002
JP 2003219226 A 7/2003
KR 20200045176 A 5/2020

OTHER PUBLICATIONS

International Search Report and Written Opinion directed to related International Application No. PCT/US2023/081788, mailed Mar. 19, 2024; 14 pages.

(Continued)

*Primary Examiner* — Charles L Beard
(74) *Attorney, Agent, or Firm* — Sterne, Kessler, Goldstein & Fox P.L.L.C.

(57) ABSTRACT

Systems, methods, and apparatuses disclosed herein can retrieve an image or a series of images, often referred to as video, that can be projected onto a media plane of a venue. These systems, methods, and apparatuses can transform the image from two-dimensions to three-dimensions for projection onto the media plane. As part of this transformation, these systems, methods, and apparatuses can logically segment the media plane into multiple slices of the media plane and the image into multiple slices of the image. Thereafter, these systems, methods, and apparatuses can project one or more pixels of the slices of the media plane onto an image space of an image slice to provide one or more points on the image slice. These systems, methods, and apparatuses thereafter weighs and accumulates color information of one or more pixels from the image slice that are nearby the one or more points on the image to interpolate color information, of the pixels of the media plane.

20 Claims, 7 Drawing Sheets

(51) Int. Cl.
  *H04N 13/167*     (2018.01)
  *H04N 13/395*     (2018.01)

(56)              References Cited

U.S. PATENT DOCUMENTS

| | | | | |
|---|---|---|---|---|
| 6,330,002 B1* | 12/2001 | Yamada | | G06T 3/4007 |
| | | | | 345/629 |
| 6,489,956 B1 | 12/2002 | Deering | | |
| 6,496,187 B1 | 12/2002 | Deering et al. | | |
| 6,664,955 B1 | 12/2003 | Deering | | |
| 6,669,346 B2* | 12/2003 | Metcalf | | G03B 37/04 |
| | | | | 353/15 |
| 6,727,971 B2* | 4/2004 | Lucas | | G03B 21/56 |
| | | | | 352/85 |
| 6,811,264 B2* | 11/2004 | Raskar | | G06T 5/80 |
| | | | | 353/30 |
| 6,937,210 B1* | 8/2005 | MacDonald | | G09F 19/18 |
| | | | | 345/428 |
| 7,106,411 B2* | 9/2006 | Read | | G03B 21/32 |
| | | | | 352/69 |
| 7,224,392 B2 | 5/2007 | Cahill et al. | | |
| 7,317,473 B2* | 1/2008 | Chen | | H04N 23/698 |
| | | | | 345/441 |
| 7,339,596 B2 | 3/2008 | Tajima | | |
| 7,382,399 B1* | 6/2008 | McCall | | H04N 23/58 |
| | | | | 348/576 |
| 7,515,747 B2 | 4/2009 | Okutomi et al. | | |
| 8,210,686 B2* | 7/2012 | DePaor | | G03B 21/00 |
| | | | | 353/62 |
| 8,358,317 B2* | 1/2013 | Carlson | | G06T 15/04 |
| | | | | 345/545 |
| 8,646,918 B2* | 2/2014 | De Paor | | G03B 37/04 |
| | | | | 353/62 |
| 8,896,601 B1* | 11/2014 | Norman | | G06F 16/29 |
| | | | | 345/585 |
| 8,902,335 B2* | 12/2014 | Doepke | | G06T 3/4038 |
| | | | | 348/36 |
| 9,020,551 B2* | 4/2015 | Kubota | | H04B 15/00 |
| | | | | 455/509 |
| 9,298,008 B2* | 3/2016 | Algreatly | | G02B 27/017 |
| 9,503,711 B2* | 11/2016 | Iversen | | H04N 9/3158 |
| 9,582,731 B1* | 2/2017 | Butko | | G06V 20/10 |
| 9,791,768 B2* | 10/2017 | Korenev | | G02B 1/11 |
| 9,792,709 B1* | 10/2017 | Meler | | G06T 11/60 |
| 9,817,627 B2* | 11/2017 | Kreiner | | H04N 21/4305 |
| 9,858,663 B2* | 1/2018 | Penney | | G06T 7/0012 |
| 10,025,549 B1* | 7/2018 | Welck | | G09G 3/001 |
| 10,044,932 B2 | 8/2018 | Martin | | |
| 10,200,596 B1 | 2/2019 | Silverstein et al. | | |
| 10,419,716 B1* | 9/2019 | Tanumihardja | | A63F 13/5252 |
| 10,419,738 B1* | 9/2019 | Phillips | | H04N 21/6587 |
| 10,573,060 B1* | 2/2020 | Ascolese | | A63F 13/52 |
| 10,600,152 B1 | 3/2020 | Fontvielle et al. | | |
| 10,614,553 B1* | 4/2020 | Wang | | G06T 7/33 |
| 10,685,478 B1* | 6/2020 | Laurino | | G06F 3/013 |
| 10,715,783 B1* | 7/2020 | Joshi | | G06T 15/205 |
| 10,740,957 B1* | 8/2020 | McElroy | | A63F 13/355 |
| 10,754,242 B2* | 8/2020 | Kim | | H04N 19/105 |
| 10,810,789 B2* | 10/2020 | Kim | | G06F 3/04847 |
| 10,848,723 B2 | 11/2020 | Liu et al. | | |
| 10,855,965 B1* | 12/2020 | Jiao | | H04N 13/383 |
| 10,861,213 B1* | 12/2020 | Holzer | | G06T 5/70 |
| 10,893,218 B1* | 1/2021 | Douady | | G06V 20/40 |
| 10,924,747 B2* | 2/2021 | Kim | | H04N 19/593 |
| 10,958,950 B2* | 3/2021 | Dore | | H04N 21/2358 |
| 10,991,068 B2* | 4/2021 | Zhu | | G06T 3/18 |
| 10,999,527 B1* | 5/2021 | Guérin | | H04N 23/73 |
| 11,138,800 B1* | 10/2021 | Seiler | | G06T 15/08 |
| 11,185,774 B1* | 11/2021 | Goldstein | | A63F 13/63 |
| 11,228,776 B1* | 1/2022 | Choi | | H04N 7/147 |
| 11,259,046 B2* | 2/2022 | Kim | | H04N 19/139 |
| 11,272,160 B2* | 3/2022 | Li | | H04N 23/661 |
| 11,375,165 B2* | 6/2022 | Boud | | G06T 3/14 |
| 11,832,145 B2* | 11/2023 | Dumas | | H04W 4/35 |
| 11,936,844 B1* | 3/2024 | Zhang | | H04N 13/398 |
| 11,962,946 B2* | 4/2024 | Ishii | | H04N 9/3185 |
| 12,058,510 B2 | 8/2024 | Elby et al. | | |
| 12,086,301 B2* | 9/2024 | Spears | | G06T 19/20 |
| 12,094,074 B2* | 9/2024 | Hitchcock | | G06T 19/20 |
| 12,143,559 B2* | 11/2024 | Ragan | | H04N 13/275 |
| 12,148,122 B2* | 11/2024 | Yang | | G06T 3/4038 |
| 12,160,964 B2* | 12/2024 | Luthwaite | | G09F 13/005 |
| 12,200,185 B1* | 1/2025 | Bacim De Araujo E Silva | | |
| | | | | H04N 13/305 |
| 12,244,886 B2* | 3/2025 | Rodriguez | | H04N 21/41415 |
| 12,469,214 B2 | 11/2025 | Ward et al. | | |
| 2001/0028352 A1 | 10/2001 | Naegle et al. | | |
| 2001/0055025 A1 | 12/2001 | Deering et al. | | |
| 2002/0000988 A1* | 1/2002 | Nelson | | G06T 11/40 |
| | | | | 345/443 |
| 2002/0005854 A1 | 1/2002 | Deering et al. | | |
| 2002/0008697 A1 | 1/2002 | Deering | | |
| 2002/0009699 A1* | 1/2002 | Hyodo | | G09B 27/00 |
| | | | | 434/285 |
| 2002/0012004 A1 | 1/2002 | Deering | | |
| 2002/0015052 A1 | 2/2002 | Deering | | |
| 2002/0033828 A1 | 3/2002 | Deering et al. | | |
| 2002/0070944 A1 | 6/2002 | Deering | | |
| 2002/0101417 A1 | 8/2002 | Burk et al. | | |
| 2002/0113787 A1* | 8/2002 | Ray | | H04N 13/275 |
| | | | | 348/E13.057 |
| 2002/0122044 A1 | 9/2002 | Deering | | |
| 2002/0158856 A1 | 10/2002 | Deering et al. | | |
| 2002/0196538 A1* | 12/2002 | Lantz | | H04N 9/3141 |
| | | | | 348/E5.143 |
| 2003/0011535 A1* | 1/2003 | Kikuchi | | G06T 15/10 |
| | | | | 345/6 |
| 2003/0011609 A1 | 1/2003 | Deering et al. | | |
| 2003/0016218 A1 | 1/2003 | Zwicker et al. | | |
| 2003/0034992 A1* | 2/2003 | Brown Elliott | | G06T 3/4069 |
| | | | | 345/690 |
| 2003/0063816 A1* | 4/2003 | Chen | | H04N 23/698 |
| | | | | 382/284 |
| 2003/0076331 A1 | 4/2003 | Deering | | |
| 2003/0085906 A1* | 5/2003 | Elliott | | G09G 3/20 |
| | | | | 345/698 |
| 2003/0103058 A1* | 6/2003 | Hellen Brown Elliott | | |
| | | | | G09G 3/20 |
| | | | | 345/589 |
| 2003/0160789 A1 | 8/2003 | Tang et al. | | |
| 2003/0206179 A1 | 11/2003 | Deering | | |
| 2004/0017608 A1* | 1/2004 | Lantz | | G03B 21/00 |
| | | | | 359/451 |
| 2004/0114047 A1 | 6/2004 | Vora et al. | | |
| 2004/0184010 A1* | 9/2004 | Raskar | | G06T 3/153 |
| | | | | 353/94 |
| 2004/0207819 A1* | 10/2004 | Moriwaki | | H04N 9/3185 |
| | | | | 353/69 |
| 2005/0007775 A1* | 1/2005 | Belliveau | | H05B 47/155 |
| | | | | 362/276 |
| 2005/0083405 A1 | 4/2005 | Imoto et al. | | |
| 2005/0190082 A1 | 9/2005 | Kumata et al. | | |
| 2005/0190346 A1* | 9/2005 | Belliveau | | H04N 5/57 |
| | | | | 348/E5.073 |
| 2005/0264879 A1* | 12/2005 | Deter | | G02B 26/125 |
| | | | | 359/451 |
| 2007/0033289 A1* | 2/2007 | Nuyttens | | H04N 7/181 |
| | | | | 348/E7.086 |
| 2007/0035656 A1 | 2/2007 | Inaba | | |
| 2007/0216782 A1 | 9/2007 | Chernoff | | |
| 2008/0100697 A1* | 5/2008 | Baker | | H04N 9/3147 |
| | | | | 348/32 |
| 2008/0204666 A1* | 8/2008 | Spearman | | G03B 21/28 |
| | | | | 353/69 |
| 2008/0298708 A1 | 12/2008 | Ovsiannikov et al. | | |
| 2008/0309815 A1 | 12/2008 | Nanjo et al. | | |
| 2009/0059096 A1* | 3/2009 | Yamamoto | | G06T 5/80 |
| | | | | 348/746 |
| 2009/0201595 A1 | 8/2009 | Matsumoto | | |
| 2009/0219381 A1* | 9/2009 | Ayala | | G06F 3/005 |
| | | | | 348/E9.002 |

(56)  References Cited

U.S. PATENT DOCUMENTS

| | | | |
|---|---|---|---|
| 2009/0244267 A1* | 10/2009 | Yuan | G06T 15/20 |
| | | | 348/51 |
| 2009/0322740 A1* | 12/2009 | Carlson | G06T 3/08 |
| | | | 345/647 |
| 2010/0001997 A1* | 1/2010 | Kajikawa | G06T 17/20 |
| | | | 345/419 |
| 2010/0033682 A1 | 2/2010 | LaDuke et al. | |
| 2010/0110069 A1 | 5/2010 | Yuan | |
| 2010/0300006 A1* | 12/2010 | Magpuri | G03B 37/00 |
| | | | 52/80.1 |
| 2011/0069237 A1* | 3/2011 | Wang | G06T 3/4007 |
| | | | 348/E5.066 |
| 2011/0229106 A1* | 9/2011 | Cho | H04N 5/775 |
| | | | 386/219 |
| 2011/0304687 A1 | 12/2011 | Joshi et al. | |
| 2012/0105702 A1* | 5/2012 | Kogure | G06T 3/06 |
| | | | 348/333.02 |
| 2012/0250937 A1 | 10/2012 | Corcoran et al. | |
| 2012/0320427 A1 | 12/2012 | Zheng et al. | |
| 2013/0044108 A1* | 2/2013 | Tanaka | H04N 13/111 |
| | | | 345/419 |
| 2013/0104182 A1* | 4/2013 | Zhang | H04N 21/8186 |
| | | | 725/127 |
| 2013/0253979 A1 | 9/2013 | Williams et al. | |
| 2014/0016100 A1* | 1/2014 | Kim | G03B 21/005 |
| | | | 353/30 |
| 2014/0071227 A1* | 3/2014 | Takenaka | H04N 23/698 |
| | | | 382/284 |
| 2014/0176917 A1 | 6/2014 | Tanaka | |
| 2014/0184742 A1* | 7/2014 | Kamp | H04N 13/128 |
| | | | 348/43 |
| 2014/0226008 A1 | 8/2014 | Lang et al. | |
| 2014/0278131 A1* | 9/2014 | Amir | G16B 5/00 |
| | | | 702/19 |
| 2015/0022869 A1 | 1/2015 | Shi et al. | |
| 2015/0062154 A1 | 3/2015 | Ellis et al. | |
| 2015/0109648 A1* | 4/2015 | Uchiyama | G02B 5/32 |
| | | | 359/8 |
| 2015/0163447 A1* | 6/2015 | Kim | G06T 3/08 |
| | | | 348/745 |
| 2015/0189248 A1 | 7/2015 | Shin | |
| 2015/0249815 A1* | 9/2015 | Sandrew | G06T 17/00 |
| | | | 348/47 |
| 2015/0348316 A1* | 12/2015 | Porcino | G06T 15/04 |
| | | | 345/426 |
| 2015/0358612 A1* | 12/2015 | Sandrew | H04N 13/261 |
| | | | 348/47 |
| 2015/0358613 A1* | 12/2015 | Sandrew | H04N 13/243 |
| | | | 348/47 |
| 2016/0005435 A1* | 1/2016 | Campbell | H04N 9/8211 |
| | | | 386/240 |
| 2016/0028997 A1* | 1/2016 | Kanai | H04N 23/698 |
| | | | 348/39 |
| 2016/0034240 A1* | 2/2016 | Kreiner | G09F 9/3026 |
| | | | 348/383 |
| 2016/0080710 A1* | 3/2016 | Hattingh | G06F 3/011 |
| | | | 348/745 |
| 2016/0086379 A1* | 3/2016 | Sadi | G02B 27/0093 |
| | | | 345/633 |
| 2016/0112489 A1* | 4/2016 | Adams | H04N 19/46 |
| | | | 375/240.01 |
| 2016/0127723 A1* | 5/2016 | Kim | H04N 9/3185 |
| | | | 348/47 |
| 2016/0142692 A1* | 5/2016 | Kim | G03B 37/04 |
| | | | 348/745 |
| 2016/0188992 A1* | 6/2016 | Hiraga | G06V 10/44 |
| | | | 382/199 |
| 2016/0191815 A1* | 6/2016 | Annau | G06Q 30/0263 |
| | | | 348/38 |
| 2016/0205341 A1* | 7/2016 | Hollander | H04N 19/46 |
| | | | 375/240.08 |
| 2016/0232827 A1* | 8/2016 | Chen | G06T 5/73 |
| 2016/0277772 A1* | 9/2016 | Campbell | G06T 19/006 |
| 2016/0300323 A1* | 10/2016 | Nakagawa | G06T 3/12 |
| 2016/0353089 A1* | 12/2016 | Gallup | H04N 13/194 |
| 2016/0381267 A1 | 12/2016 | Waldron et al. | |
| 2017/0064295 A1* | 3/2017 | Stolzberg | E04H 3/22 |
| 2017/0134731 A1 | 5/2017 | Tourapis et al. | |
| 2017/0244775 A1* | 8/2017 | Ha | G06T 1/20 |
| 2017/0251208 A1* | 8/2017 | Adsumilli | H04N 19/124 |
| 2017/0293998 A1* | 10/2017 | Kim | G06T 7/33 |
| 2017/0295356 A1* | 10/2017 | Abbas | H04N 13/243 |
| 2017/0302714 A1* | 10/2017 | Ramsay | G06F 40/134 |
| 2017/0330337 A1* | 11/2017 | Mizutani | G06T 5/50 |
| 2017/0339440 A1* | 11/2017 | Galpin | G06T 19/006 |
| 2018/0007387 A1* | 1/2018 | Izumi | H04N 19/39 |
| 2018/0007389 A1* | 1/2018 | Izumi | H04N 21/21805 |
| 2018/0020202 A1* | 1/2018 | Xu | H04N 19/86 |
| 2018/0020238 A1* | 1/2018 | Liu | H04N 19/124 |
| 2018/0020248 A1* | 1/2018 | Lai | H04N 21/2353 |
| 2018/0027226 A1* | 1/2018 | Abbas | G06T 15/20 |
| | | | 348/47 |
| 2018/0035172 A1* | 2/2018 | Lai | H04N 21/234363 |
| 2018/0039856 A1* | 2/2018 | Hara | G06N 3/08 |
| 2018/0048877 A1* | 2/2018 | Lai | H04N 13/178 |
| 2018/0054613 A1* | 2/2018 | Lin | H04N 19/117 |
| 2018/0061002 A1* | 3/2018 | Lee | H04N 19/597 |
| 2018/0063505 A1* | 3/2018 | Lee | H04N 19/597 |
| 2018/0109772 A1* | 4/2018 | Xu | H04N 19/597 |
| 2018/0109810 A1* | 4/2018 | Xu | H04N 19/597 |
| 2018/0113997 A1* | 4/2018 | Tanigawa | G06T 7/11 |
| 2018/0114348 A1* | 4/2018 | Lu | G06T 3/20 |
| 2018/0122042 A1* | 5/2018 | Kim | H04N 5/2628 |
| 2018/0131920 A1* | 5/2018 | Kim | H04N 13/344 |
| 2018/0144488 A1* | 5/2018 | Kim | G06T 3/12 |
| 2018/0146138 A1* | 5/2018 | Jeon | H04N 21/47 |
| 2018/0165830 A1* | 6/2018 | Danieau | G06F 3/012 |
| 2018/0165886 A1* | 6/2018 | Lin | G06T 19/00 |
| 2018/0167555 A1* | 6/2018 | Li | G09G 3/32 |
| 2018/0167596 A1* | 6/2018 | Buffin | H04N 9/3185 |
| 2018/0184121 A1* | 6/2018 | Kim | H04N 19/176 |
| 2018/0199029 A1* | 7/2018 | Van Der Auwera | |
| | | | H04N 5/2628 |
| 2018/0199042 A1* | 7/2018 | Wang | H04N 19/167 |
| 2018/0205934 A1* | 7/2018 | Abbas | H04N 23/698 |
| 2018/0211443 A1* | 7/2018 | Abbas | G06T 3/12 |
| 2018/0227484 A1* | 8/2018 | Hung | G06T 3/18 |
| 2018/0240223 A1* | 8/2018 | Yi | G06T 3/00 |
| 2018/0276788 A1* | 9/2018 | Lee | G06T 3/047 |
| 2018/0276789 A1* | 9/2018 | Van Der Auwera | |
| | | | H04N 19/172 |
| 2018/0276826 A1* | 9/2018 | Van Der Auwera | |
| | | | G02B 27/017 |
| 2018/0322611 A1* | 11/2018 | Bang | G06T 3/12 |
| 2018/0322688 A1* | 11/2018 | Ozguner | G06T 3/20 |
| 2018/0332265 A1* | 11/2018 | Hwang | H04N 21/8451 |
| 2018/0338160 A1* | 11/2018 | Lee | H04N 13/117 |
| 2018/0350134 A1* | 12/2018 | Lodato | G06T 17/20 |
| 2018/0359459 A1* | 12/2018 | Lee | H04N 13/111 |
| 2018/0374192 A1* | 12/2018 | Kunkel | H04N 23/58 |
| 2019/0026934 A1* | 1/2019 | Shih | H04N 19/124 |
| 2019/0028642 A1* | 1/2019 | Fujita | H04N 21/4622 |
| 2019/0051037 A1* | 2/2019 | Chui | G06T 11/40 |
| 2019/0052836 A1 | 2/2019 | Kawasumi | |
| 2019/0058862 A1* | 2/2019 | Kim | G06F 3/1446 |
| 2019/0080001 A1* | 3/2019 | Lin | G06T 3/18 |
| 2019/0089943 A1* | 3/2019 | Yun | H04N 13/117 |
| 2019/0108611 A1* | 4/2019 | Izumi | G06T 3/12 |
| 2019/0121515 A1* | 4/2019 | Nashida | G06T 19/006 |
| 2019/0132576 A1* | 5/2019 | Zhang | H04N 23/90 |
| 2019/0139296 A1* | 5/2019 | Lakshman | G06T 7/596 |
| 2019/0158809 A1* | 5/2019 | Sasaki | H04N 13/221 |
| 2019/0182462 A1* | 6/2019 | Abbas | H04N 23/698 |
| 2019/0208216 A1* | 7/2019 | Yamori | H04N 19/17 |
| 2019/0230142 A1* | 7/2019 | He | H04L 65/70 |
| 2019/0230377 A1* | 7/2019 | Ma | H04N 19/85 |
| 2019/0238609 A1* | 8/2019 | Skupin | H04L 65/762 |
| 2019/0238861 A1* | 8/2019 | D'Acunto | H04N 21/816 |
| 2019/0268608 A1* | 8/2019 | Ma | H04N 19/51 |
| 2019/0273936 A1* | 9/2019 | Ma | H04N 19/51 |
| 2019/0289327 A1* | 9/2019 | Lin | H04N 19/597 |

(56) References Cited

U.S. PATENT DOCUMENTS

| | | | |
|---|---|---|---|
| 2019/0318452 A1 | 10/2019 | Oh et al. | |
| 2019/0325553 A1* | 10/2019 | Lin | G02B 27/017 |
| 2019/0335203 A1* | 10/2019 | Li | H04N 19/593 |
| 2019/0342577 A1* | 11/2019 | Alshina | H04N 21/4345 |
| 2019/0342578 A1* | 11/2019 | Lee | H04N 19/176 |
| 2019/0356899 A1* | 11/2019 | Oh | H04N 21/81 |
| 2019/0356940 A1* | 11/2019 | Mallett | H04N 19/33 |
| 2019/0364204 A1* | 11/2019 | Wozniak | H04N 21/816 |
| 2019/0364205 A1* | 11/2019 | Wozniak | H04N 21/816 |
| 2019/0373240 A1* | 12/2019 | Alshina | H04N 19/597 |
| 2019/0373245 A1* | 12/2019 | Lee | H04N 21/8456 |
| 2019/0373287 A1* | 12/2019 | Lim | H04N 19/105 |
| 2019/0379856 A1* | 12/2019 | Hur | H04N 5/2624 |
| 2019/0379876 A1* | 12/2019 | Hur | H04N 13/178 |
| 2019/0387212 A1* | 12/2019 | Oh | G06T 7/80 |
| 2020/0014905 A1* | 1/2020 | Oh | H04N 21/8456 |
| 2020/0021791 A1* | 1/2020 | Hur | H04N 21/6587 |
| 2020/0043133 A1* | 2/2020 | Boyce | G06T 3/60 |
| 2020/0045286 A1* | 2/2020 | Boyce | H04N 21/2353 |
| 2020/0053330 A1 | 2/2020 | Takahashi et al. | |
| 2020/0053393 A1* | 2/2020 | Niamut | H04N 19/597 |
| 2020/0059668 A1* | 2/2020 | Ikonin | H04N 19/51 |
| 2020/0074687 A1* | 3/2020 | Lin | G06T 19/006 |
| 2020/0077070 A1* | 3/2020 | Takahashi | H04N 13/122 |
| 2020/0077092 A1* | 3/2020 | Lin | H04N 19/70 |
| 2020/0105063 A1* | 4/2020 | Wang | H04N 21/4728 |
| 2020/0107008 A1* | 4/2020 | Hur | H04N 13/183 |
| 2020/0111193 A1 | 4/2020 | Rephaeli et al. | |
| 2020/0128238 A1* | 4/2020 | Lee | H04N 19/159 |
| 2020/0137417 A1* | 4/2020 | Izumi | H04N 21/4728 |
| 2020/0137418 A1* | 4/2020 | Onno | H04N 19/184 |
| 2020/0145663 A1* | 5/2020 | Li | H04N 19/124 |
| 2020/0153885 A1* | 5/2020 | Lee | G06T 15/005 |
| 2020/0162713 A1* | 5/2020 | Zink | G06F 3/1446 |
| 2020/0162716 A1* | 5/2020 | Sasaki | H04N 13/366 |
| 2020/0177859 A1* | 6/2020 | Sasaki | H04N 13/324 |
| 2020/0177862 A1* | 6/2020 | Routhier | H04N 13/122 |
| 2020/0177916 A1* | 6/2020 | Niamut | H04N 19/46 |
| 2020/0193232 A1* | 6/2020 | Wang | G06F 18/2148 |
| 2020/0195906 A1* | 6/2020 | Van Hoff | H04N 13/296 |
| 2020/0221061 A1* | 7/2020 | Kim | G06F 3/1446 |
| 2020/0228843 A1* | 7/2020 | Lin | H04N 19/70 |
| 2020/0252594 A1* | 8/2020 | Lee | H04N 13/398 |
| 2020/0265618 A1* | 8/2020 | Chen | A61B 6/487 |
| 2020/0267385 A1* | 8/2020 | Lim | H04N 19/117 |
| 2020/0273205 A1* | 8/2020 | Yamashita | H04N 17/002 |
| 2020/0275088 A1* | 8/2020 | Colin | G06T 17/10 |
| 2020/0275129 A1* | 8/2020 | Deshpande | H04N 19/186 |
| 2020/0279438 A1* | 9/2020 | Ohashi | H04N 13/111 |
| 2020/0286206 A1* | 9/2020 | Lu | G06T 3/20 |
| 2020/0288169 A1* | 9/2020 | Liu | H04N 19/597 |
| 2020/0296302 A1* | 9/2020 | Shiro | H04N 5/2628 |
| 2020/0296350 A1* | 9/2020 | Oh | H04N 13/194 |
| 2020/0320747 A1* | 10/2020 | Izumi | G06T 3/00 |
| 2020/0322586 A1* | 10/2020 | Lee | H04N 21/8583 |
| 2020/0322632 A1* | 10/2020 | Hanhart | H04N 19/117 |
| 2020/0336720 A1* | 10/2020 | Rogozinski | G06T 7/246 |
| 2020/0336762 A1* | 10/2020 | Lee | H04N 19/55 |
| 2020/0344489 A1* | 10/2020 | Wenger | H04N 19/176 |
| 2020/0351449 A1* | 11/2020 | Oh | H04N 13/156 |
| 2020/0359007 A1* | 11/2020 | Izumi | H04N 13/111 |
| 2020/0374504 A1* | 11/2020 | Taylor | H04N 13/156 |
| 2020/0374505 A1* | 11/2020 | Kammachi Sreedhar | |
| | | | H04N 21/854 |
| 2020/0374558 A1* | 11/2020 | Li | H04N 19/164 |
| 2020/0389573 A1* | 12/2020 | Kobayashi | H04N 23/72 |
| 2020/0413093 A1* | 12/2020 | Newman | H04N 19/176 |
| 2021/0004932 A1* | 1/2021 | Newman | H04N 23/698 |
| 2021/0018756 A1* | 1/2021 | Henry | B64D 47/08 |
| 2021/0037225 A1* | 2/2021 | Pepperell | G06F 3/013 |
| 2021/0042948 A1* | 2/2021 | Morimoto | G06T 7/557 |
| 2021/0044747 A1* | 2/2021 | Panchagnula | H04N 13/111 |
| 2021/0051331 A1* | 2/2021 | Konda | H04N 19/117 |
| 2021/0058604 A1* | 2/2021 | Nakata | G03B 17/00 |
| 2021/0067758 A1* | 3/2021 | Choi | H04N 13/243 |
| 2021/0090214 A1* | 3/2021 | Newman | H04N 21/21805 |
| 2021/0092418 A1* | 3/2021 | Han | H04N 19/597 |
| 2021/0112275 A1* | 4/2021 | Kk | H04N 19/597 |
| 2021/0127059 A1 | 4/2021 | Powell et al. | |
| 2021/0176446 A1* | 6/2021 | Oh | H04N 13/158 |
| 2021/0188167 A1 | 6/2021 | Fursich et al. | |
| 2021/0203995 A1* | 7/2021 | Lee | H04N 19/70 |
| 2021/0266506 A1 | 8/2021 | Ichieda | |
| 2021/0274146 A1* | 9/2021 | Oh | H04N 13/194 |
| 2021/0294558 A1* | 9/2021 | Griffin | H04L 69/28 |
| 2021/0314558 A1* | 10/2021 | Choi | H04N 19/127 |
| 2021/0314647 A1 | 10/2021 | Mallett | |
| 2021/0321072 A1* | 10/2021 | Oh | H04N 13/194 |
| 2021/0329214 A1* | 10/2021 | Oh | H04N 13/178 |
| 2021/0337243 A1* | 10/2021 | Oh | H04N 19/597 |
| 2021/0368157 A1* | 11/2021 | Overbeck | H04N 13/161 |
| 2021/0385423 A1* | 12/2021 | Oh | H04N 19/597 |
| 2021/0407214 A1* | 12/2021 | Le Roux | G06T 19/003 |
| 2022/0014731 A1* | 1/2022 | Bang | H04N 19/105 |
| 2022/0020109 A1* | 1/2022 | Hsu | H04N 9/3147 |
| 2022/0030264 A1* | 1/2022 | Niamut | H04N 19/52 |
| 2022/0038709 A1* | 2/2022 | Da Silva Pratas Gabriel | |
| | | | H04N 19/105 |
| 2022/0083262 A1* | 3/2022 | Proulx | G06F 3/0605 |
| 2022/0129159 A1* | 4/2022 | Randall | G06F 3/067 |
| 2022/0161720 A1 | 5/2022 | Fursich et al. | |
| 2022/0200815 A1* | 6/2022 | Schwitalla | H04L 12/1831 |
| 2022/0203249 A1* | 6/2022 | Green | A63G 31/16 |
| 2022/0217314 A1* | 7/2022 | Oh | H04N 21/234 |
| 2022/0224871 A1* | 7/2022 | Van Brandenburg | |
| | | | H04N 13/111 |
| 2022/0256131 A1* | 8/2022 | Oh | H04N 21/6587 |
| 2022/0329772 A1* | 10/2022 | Otsuka | H04N 19/436 |
| 2022/0345721 A1* | 10/2022 | Otsuka | H04N 21/24 |
| 2023/0032321 A1 | 2/2023 | Grillo et al. | |
| 2023/0043464 A1* | 2/2023 | Song | H04N 13/15 |
| 2023/0050797 A1* | 2/2023 | King | G06F 17/18 |
| 2023/0051412 A1* | 2/2023 | da Silva Pratas Gabriel | |
| | | | H04N 19/105 |
| 2023/0051471 A1* | 2/2023 | Kim | H04N 19/117 |
| 2023/0086983 A1* | 3/2023 | Won | G06T 7/55 |
| | | | 348/47 |
| 2023/0093097 A1* | 3/2023 | Nolan | G06T 15/10 |
| | | | 382/154 |
| 2023/0099005 A1* | 3/2023 | Tomono | H04L 12/1818 |
| | | | 726/5 |
| 2023/0154063 A1* | 5/2023 | Backer | G06T 11/10 |
| | | | 345/589 |
| 2023/0179798 A1* | 6/2023 | Hamada | H04N 13/161 |
| | | | 375/240.12 |
| 2023/0209205 A1* | 6/2023 | Hu | G06T 3/08 |
| | | | 348/36 |
| 2023/0226768 A1* | 7/2023 | Kothari | G06T 3/4046 |
| 2023/0237628 A1 | 7/2023 | Gharbi et al. | |
| 2023/0262208 A1* | 8/2023 | Appelgate | H04N 19/46 |
| | | | 348/41 |
| 2023/0308622 A1* | 9/2023 | Sawada | H04N 23/55 |
| 2023/0316457 A1* | 10/2023 | Morgan | G06T 7/64 |
| | | | 345/634 |
| 2023/0360572 A1* | 11/2023 | Welck | G09G 3/03 |
| 2023/0362409 A1* | 11/2023 | Chupeau | H04N 19/70 |
| 2023/0409884 A1* | 12/2023 | Sakamoto | G06N 3/0464 |
| 2024/0007610 A1* | 1/2024 | Takahashi | H04N 13/361 |
| 2024/0018487 A1 | 1/2024 | Alam | |
| 2024/0020927 A1* | 1/2024 | Kovacevic | G03B 37/04 |
| 2024/0037713 A1* | 2/2024 | O'Neil | G06T 3/18 |
| 2024/0062689 A1* | 2/2024 | Yang | G02B 30/29 |
| 2024/0161232 A1 | 5/2024 | Akbarpour et al. | |
| 2024/0205513 A1* | 6/2024 | Kozuka | G09G 5/377 |
| 2024/0214529 A1 | 6/2024 | DaSilva et al. | |
| 2024/0214676 A1 | 6/2024 | DaSilva et al. | |
| 2024/0223738 A1* | 7/2024 | Arimatsu | H04N 13/111 |
| 2024/0232659 A1* | 7/2024 | Kakuda | G06N 5/022 |
| 2024/0233240 A1* | 7/2024 | Demeure | G06T 15/04 |
| 2024/0269553 A1* | 8/2024 | Li | G06F 3/1454 |
| 2024/0323310 A1* | 9/2024 | Hasegawa | H04N 23/698 |
| 2024/0331117 A1* | 10/2024 | Xu | G06T 3/06 |
| 2024/0346970 A1* | 10/2024 | Welck | G09G 3/03 |

(56)         References Cited

U.S. PATENT DOCUMENTS

| | | | |
|---|---|---|---|
| 2024/0348763 A1* | 10/2024 | Cardenas Gasca | ....... G06T 3/40 |
| 2024/0348766 A1* | 10/2024 | Wu | ...................... H04N 9/3141 |
| 2024/0392593 A1* | 11/2024 | Meier | ...................... E04H 3/28 |
| 2024/0420277 A1* | 12/2024 | Porubanova | ............. G06T 3/04 |
| 2024/0428511 A1* | 12/2024 | Ward | ...................... G06T 15/10 |
| 2025/0131533 A1* | 4/2025 | Jang | ...................... G06T 3/4053 |
| 2025/0148569 A1* | 5/2025 | Herman | ................... G06T 5/50 |
| 2025/0157133 A1* | 5/2025 | Snavely | .................. G06T 15/20 |
| 2025/0193351 A1 | 6/2025 | Kubota et al. | |
| 2025/0292498 A1* | 9/2025 | Badki | .................... G06T 17/00 |
| 2025/0294306 A1 | 9/2025 | Fan et al. | |

OTHER PUBLICATIONS

International Search Report and Written Opinion for Application No. PCT/US2023/081767, mailed on May 16, 2024, 18 pages.
Office Action for European Application No. 25176817.2, mailed Oct. 7, 2025, 2 pages.

* cited by examiner

400

PROJECT THE PIXELS OF THE
VENUE ONTO THE IMAGE ⟋ 402

INTERPOLATE COLOR
INFORMATION FOR THE PIXELS ⟋ 404

PROVIDE THE COLOR TO THE
VENUE FOR PROJECTION ONTO
THE VENUE ⟋ 406

PROJECTING IMAGES ON A SPHERICAL VENUE

CROSS-REFERENCE TO RELATED APPLICATIONS

The present application claims the benefit of U.S. Provisional Patent Application No. 63/434,366, filed Dec. 21, 2022, which is incorporated herein by reference in its entirety.

BACKGROUND

The United States Media and Entertainment Industry is the largest in the world. The United States Media and Entertainment Industry represents a third of the global media and entertainment industry which delivers events, such as musical events, theatrical events, sporting events, and/or motion picture events, to spectators for their viewing pleasure. These events often include an image or a series of images, often referred to as video, that can be projected onto a media plane of a venue to enhance the emersion of the audience in the event. Often times, conventional venues include large two-dimensional visual displays, also referred to as jumbotrons, for displaying these images to the audience. However, as the media planes of the venues have become more sophisticated, for example, expanding from the large two-dimensional visual displays into even larger three-dimensional visual displays that surround the audience, the conventional processing capabilities used to displaying these images on the the large two-dimensional visual displays is insufficient to display these images on the even larger three-dimensional visual displays.

BRIEF DESCRIPTION OF THE DRAWINGS

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 1:
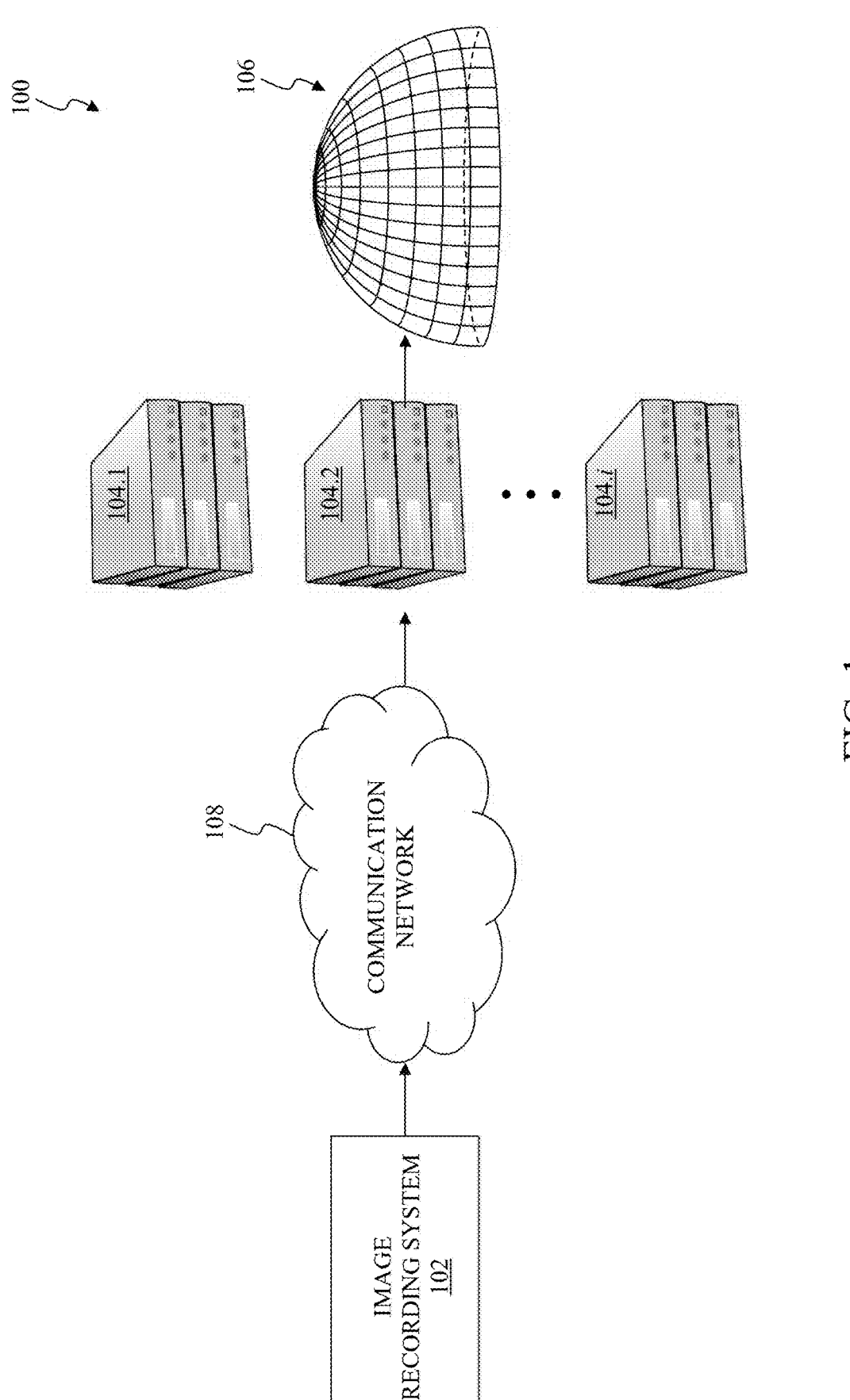
FIG. 1 illustrates a simplified block diagram of an exemplary image projection system according to some exemplary embodiments of the present disclosure.

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

Overview

Systems, methods, and apparatuses disclosed herein can retrieve an image or a series of images, often referred to as video, that can be projected onto a media plane of a venue. These systems, methods, and apparatuses can transform the image from two-dimensions to three-dimensions for projection onto the media plane. As part of this transformation, these systems, methods, and apparatuses can logically segment the media plane into multiple slices of the media plane and the image into multiple slices of the image. Thereafter, these systems, methods, and apparatuses can project one or more pixels of the slices of the media plane onto an image space of an image slice to provide one or more points on the image slice. These systems, methods, and apparatuses thereafter weighs and accumulates color information of one or more pixels from the image slice that are nearby the one or more points on the image to interpolate color information, of the pixels of the media plane.

Exemplary Image Projection System

FIG. 1 illustrates a simplified block diagram of an exemplary image projection system according to some exemplary embodiments of the present disclosure. In the exemplary embodiment illustrated in FIG. 1, an image projection system 100 can retrieve an image or a series of images, often referred to as video, that can be projected onto a media plane of a venue. As to be described in further detail below, the image projection system 100 can transform the image from two-dimensions to three-dimensions for projection onto the three-dimensional media plane. In some embodiments, the image projection system 100 can logically segment the three-dimensional media plane into multiple slices of the three-dimensional media plane and the two-dimensional image into multiple slices of the two-dimensional image. In these embodiments, the image projection system 100 can utilize a kernel-based sampling technique to project one or more picture elements, also referred to as pixels, of the three-dimensional slices of the three-dimensional media plane onto a two-dimensional image space of a two-dimensional image slice to provide one or more two-dimensional points on the two-dimensional image slice. In these embodiments, the kernel-based sampling technique thereafter weighs and accumulates color information of one or more pixels from the image that are nearby the one or more two-dimensional points on the two-dimensional image slice to interpolate color information, for example, luminance and/or chrominance components of YUV color model and/or red, green, and/or blue components of a RGB color model to provide some examples, of the pixels of the three-dimensional media plane. An exemplary embodiment of the kernel-based sampling technique is further described in U.S. patent application Ser. No. 18/332,874, filed on Jun. 12, 2023, which is incorporated herein by reference in its entirety. As illustrated in FIG. 1, the image projection system

100 can include an image recording system 102 that can be communicatively coupled to image processing servers 104.1 through 104._i_ and a venue 106 via a communication network 108. Although the image projection system 100 is illustrated in FIG. 1 as including multiple, discrete devices, those skilled in the relevant art(s) will recognize that one of more of these devices can be combined without departing from the spirit and scope of the present disclosure. For example, the image recording system 102 and one or more of the image processing servers 104.1 through 104._i_ can be combined into a single discrete device without the communication network 108 as will be apparent to those skilled in the relevant art(s) without departing from the spirit and scope of the present disclosure.

The image recording system 102 can store one or more digital image signals. In the exemplary embodiment illustrated in FIG. 1, the image recording system 102 can include, or can be communicatively coupled to, an image capture system. Generally, the image capture system can include a camera lens system to project light that is captured by the camera lens system onto an image sensor. An exemplary embodiment of the image capture system is further described in U.S. patent application Ser. No. 18/332,855, filed on Jun. 12, 2023, which is incorporated herein by reference in its entirety. In some embodiments, the one or more digital image signals can be stored by the image recording system 102 as raw camera image files having radiometric characteristics of the light captured by an image capture system. These radiometric characteristics can include color information, for example, luminance and/or chrominance components of YUV color model and/or red, green, and/or blue components of a RGB color model to provide some examples, of each pixel of the image sensor. Alternatively, or in addition to, the image can be stored by the image recording system 102 in any suitable well-known image file format, such as Joint Photographic Experts Group (JPEG) image file format, Exchangeable Image File Format (EXIF), Tagged Image File Format (TIFF), Graphics Interchange Format (GIF), bitmap image file (BMP) format, or Portable Network Graphics (PNG) image file format to provide some examples, that will be apparent to those skilled in the relevant art(s) without departing from the spirit and scope of the present disclosure. In some embodiments, the image recording system 102 can include a machine-readable medium that can include any mechanism for storing the one or more digital image signals in a form readable by a machine, such as one or more of the image processing servers 104.1 through 104._i_ to provide an example. In these embodiments, a machine-readable medium can include read only memory (ROM); random access memory (RAM); magnetic disk storage media; optical storage media; flash memory devices; and others. Alternately, or in addition to, the machine-readable medium can include a hard disk drive, for example, a solid-state driver, a floppy disk drive along with associated removable media, a CD-ROM drive, an optical drive, a flash memory, or removable media cartridges to persistently storage the one or more digital image signals.

The image processing servers 104.1 through 104._i_ include one or more computer systems, an exemplary embodiment of which is to be described in further detail below, to retrieve the image stored in the image recording system 102. Alternatively, or in addition to, image processing servers 104.1 through 104._i_ can reconstruct the image from the one or more digital image signals stored in the image recording system 102. In some embodiments, the image processing servers 104.1 through 104._i_ can implement one or more digital image processing techniques, also referred to as digital picture processing techniques, to process the one or more digital image signals that are stored in the image recording system 102 to reconstruct the image from the one or more digital image signals. In some embodiments, the one or more digital image processing techniques can include decoding, demosaicing, defective pixel removal, white balancing, noise reduction, color translation, tone reproduction, compression, removal of systematic noise, dark frame subtraction, optical correction, contrast manipulation, unsharp masking, and/or any other suitable well known digital image processing technique that will be apparent to those skilled in the relevant art(s) without departing from the spirit and scope of the present disclosure.

In the exemplary embodiment illustrated in FIG. 1, the image processing servers 104.1 through 104._i_ can be assigned to different three-dimensional slices of the three-dimensional media plane. The venue 106 is to be described in further detail below. In some embodiments, the different three-dimensional slices of the three-dimensional media plane can be associated with different slices of the image. In these embodiments, one or more of the image processing servers from among the image processing servers 104.1 through 104._i_ can assign the different three-dimensional slices of the three-dimensional media plane to the image processing servers 104.1 through 104._i_ and/or associate the different three-dimensional slices of the three-dimensional media plane with different slices of the image. After retrieving the image and/or reconstructing the image from the one or more digital image signals, the image processing servers 104.1 through 104._i_ can mathematically transform two-dimensional coordinates of the slices of the image into three-dimensional coordinates of the three-dimensional slices of the three-dimensional media plane to enable the image to be projected onto the three-dimensional media plane of the venue 106. The image processing servers 104.1 through 104._i_ operate in a substantially similar manner one another; therefore, the operation of the image processing server 104.1 is to be described in further detail below for simplicity.

In the exemplary embodiment illustrated in FIG. 1, the image processing server 104.1 can utilize a kernel-based sampling technique to mathematically transform two-dimensional coordinates of a corresponding slice of the image into the three-dimensional coordinates of a corresponding three-dimensional slice of the three-dimensional media plane. In some embodiments, the kernel-based sampling technique projects the pixels of the corresponding three-dimensional slice of the three-dimensional media plane onto a two-dimensional image space of the corresponding slice of the image to effectively transform the pixels of corresponding three-dimensional slice of the three-dimensional media plane into two-dimensional coordinates of two-dimensional points that are projected onto the corresponding slice of the image.

After projecting the three-dimensional coordinates of the corresponding three-dimensional slice of the three-dimensional media plane onto the corresponding slice of the image, the kernel-based sampling technique statistically interpolates color information, for example, luminance and/or chrominance components of YUV color model and/or red, green, and/or blue components of a RGB color model to provide some examples, of the corresponding three-dimensional slice of the three-dimensional media plane from the corresponding slice of the image. In some embodiments, the kernel-based sampling technique can statistically interpolate the color information of the pixels of the corresponding three-dimensional slice of the three-dimensional media plane based upon color information of the corresponding slice of the image. In these embodiments, the kernel-based sampling technique can statistically interpolate the color information of the pixels of the corresponding three-dimensional slice of the three-dimensional media plane by weighing and accumulating the color information of pixels of the corresponding slice of the image that are nearby the two-dimensional points that are projected on the corresponding slice of the image.

After interpolating the color information of the corresponding three-dimensional slice of the three-dimensional media plane, the image processing server 104.1 can provide the color information to the venue 106 to project the corresponding slice of the image onto the venue 106. In some embodiments, the image processing server 104.1 can generate quadruples for the color information of the corresponding three-dimensional slice of the three-dimensional media plane that include the three-dimensional coordinates of the corresponding three-dimensional slice of the three-dimensional media plane and the color information for the corresponding three-dimensional slice that have been statistically interpolated from the image.

The venue 106 projects the color information of the different three-dimensional slices of the three-dimensional media plane provided by the image processing servers 104.1 through 104.$i$ onto the pixels of the different three-dimensional slices of the three-dimensional media plane to project the different slices of the image onto the three-dimensional media plane. In some embodiments, the image processing servers 104.1 through 104.$i$ can provide sufficient processing capabilities to the image projection system 100 to project the image onto the three-dimensional media plane in real-time, or near real-time. For example, the image processing servers 104.1 through 104.$i$ can retrieve the image at an approximate rate of 24 frames per second. In this example, the image processing servers 104.1 through 104.$i$ can process the image as described above to project the image onto the three-dimensional media plane at an approximate rate of 240 frames per second.

The communication network 108 communicatively couples the image recording system 102 and the image processing servers 104.1 through 104.$i$. The communication network 108 can implemented as a wireless communication network, a wireline communication network, and/or any combination thereof that will be apparent to those skilled in the relevant art(s) without departing from the spirit and scope of the present disclosure. In some embodiments, the communication network 108 can include a fiber optic network or a coaxial network that uses optical fiber or coaxial cable to communicatively couple the image recording system 102 and the image processing servers 104.1 through 104.$i$. In some embodiments, the communication network 108 can include a hybrid fiber coaxial (HFC) network that combines optical fiber and coaxial cable to communicatively couple the image recording system 102 and the image processing servers 104.1 through 104.$i$.

Figure 2A:
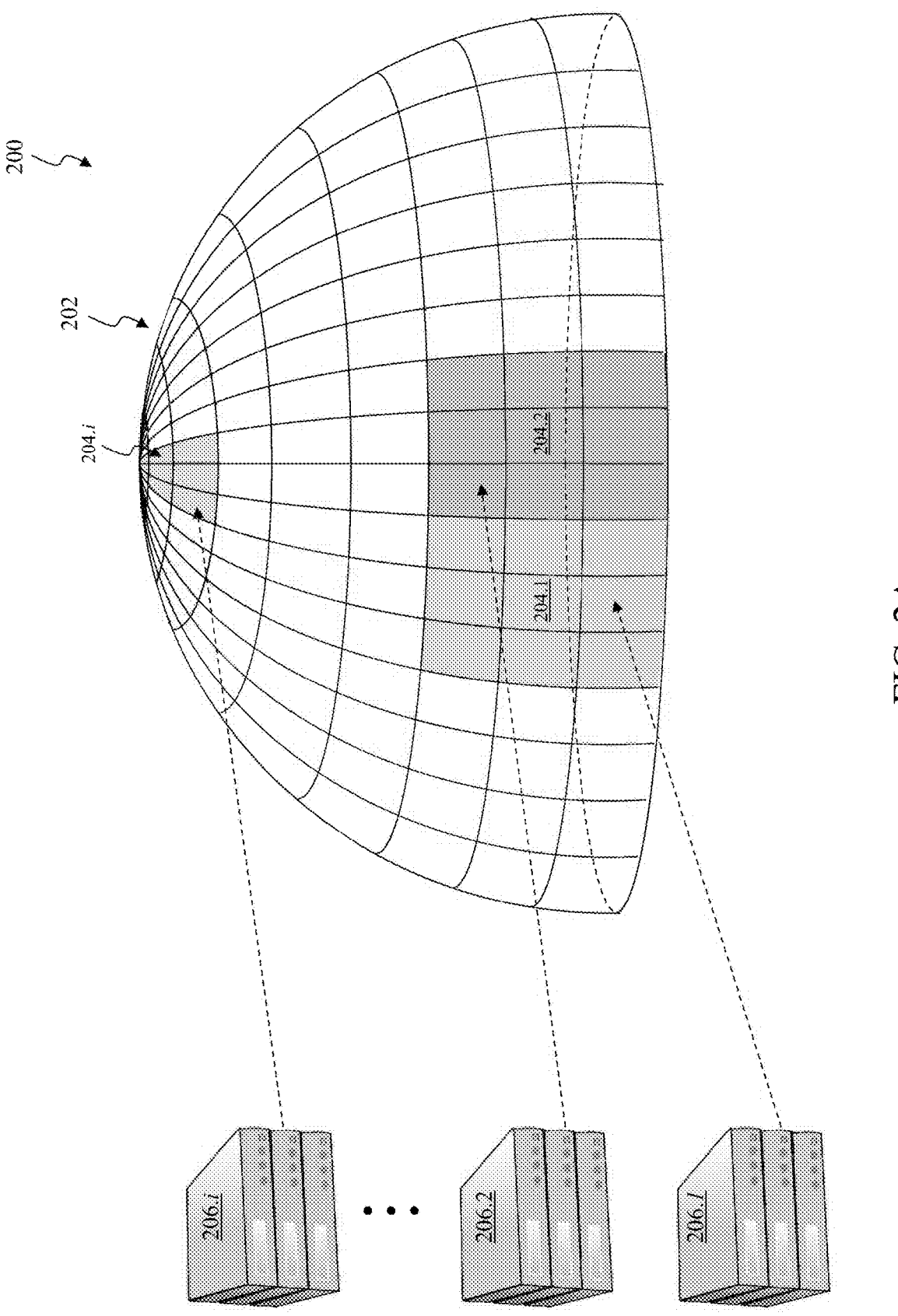
FIG. 2A and FIG. 2B illustrate simplified block diagrams of an exemplary venue according to some exemplary embodiments of the present disclosure.
Figure 2B:
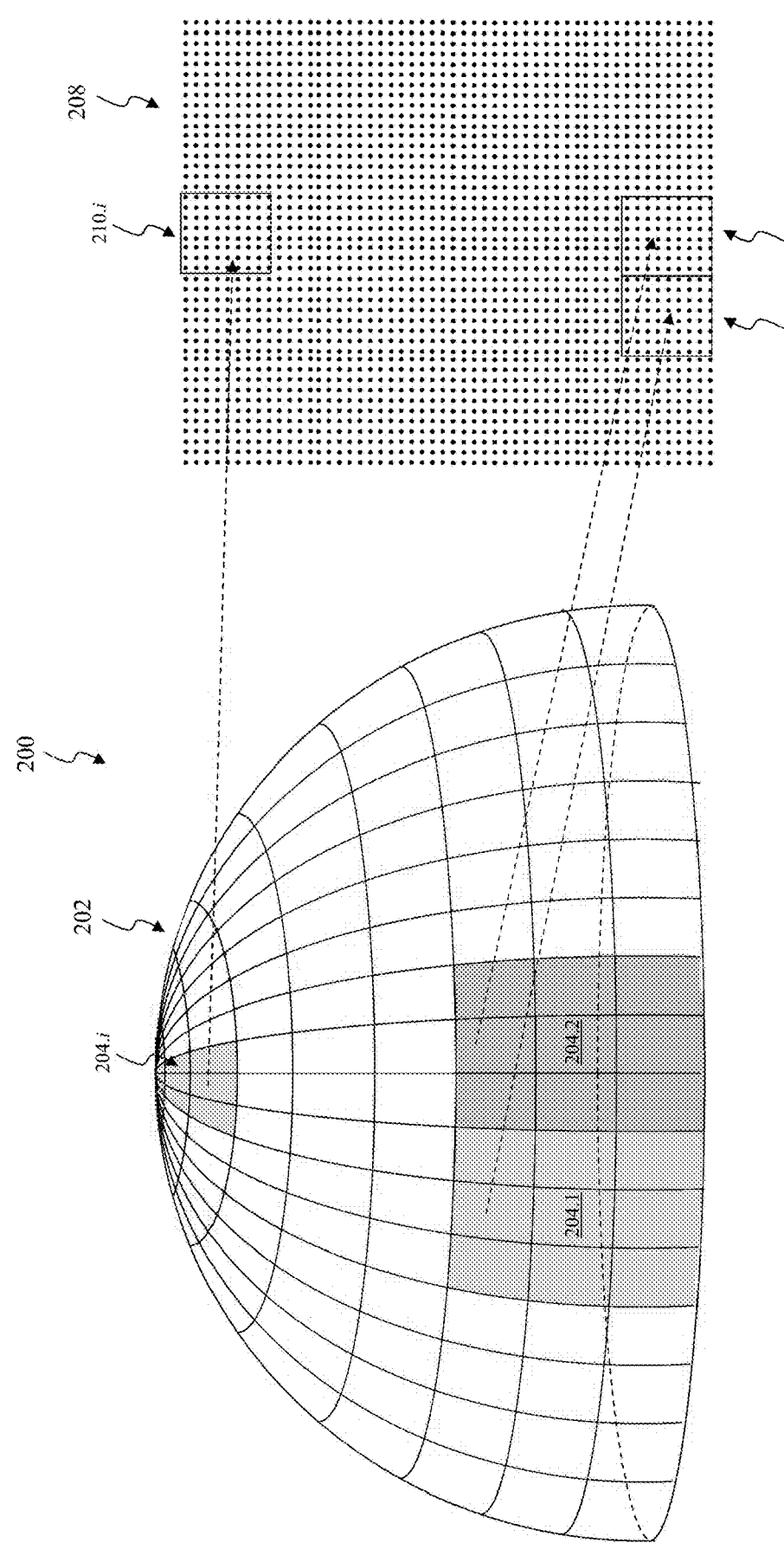

Exemplary Venue that can be Implemented within the Exemplary Image Projection System FIG. 2A and FIG. 2B illustrate simplified block diagrams of an exemplary venue according to some exemplary embodiments of the present disclosure. In the exemplary embodiments illustrated in FIG. 2A and FIG. 2B, a venue 200 represents a location for hosting an event. For example, the venue 200 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. The event can include a musical event, a theatrical event, a sporting event, a motion picture, and/or any other suitable event that will be apparent to those skilled in the relevant art(s) without departing the spirit and scope of the present disclosure. The venue 200 can represent an exemplary embodiment of the venue 106 as described above in FIG. 1.

In the exemplary embodiments illustrated in FIG. 2A and FIG. 2B, the venue 200 can represent a three-dimensional structure, for example, a hemisphere structure, also referred to as a hemispherical dome. In some embodiments, the venue 200 can include one or more visual displays, often referred to as the three-dimensional media plane 202, that are spread across the interior, or intrados, of the venue 200. In these embodiments, the one or more visual displays can include a series of rows and a series of columns of picture elements, also referred to as pixels, in three-dimensions that form a three-dimensional media plane 202. In these embodiments, the pixels can be implemented using one or more light-emitting diode (LED) displays, one or more organic light-emitting diode (OLED) displays, and/or one or more quantum dots (QDs) displays to provide some examples. For example, the three-dimensional media plane 202 can include an approximate 16,000 by 16,000 LED visual display that wraps around the interior of the venue 200 to form an approximate 160,000 square foot visual display. As illustrated in FIG. 2A, the three-dimensional media plane 202 can be logically segmented into three-dimensional slices 204.1 through 204.$i$ of the three-dimensional media plane 202. In some embodiments, the three-dimensional slices 204.1 through 204.$i$ can occupy arbitrary geometric regions, for example, rectangular shapes, of pixels of the three-dimensional media plane 202. In these embodiments, the arbitrary geometric regions can include closed geometric regions, such as regular curves; such as circles or ellipses, irregular curves; regular polygons, such as equilateral triangles or squares, and/or irregular polygons, such as rectangles and/or parallelograms to provide some examples. In these embodiments, one or more of the three-dimensional slices 204.1 through 204.$i$ can occupy similar geometric regions with respect to one another and/or one or more of the three-dimensional slices 204.1 through 204.$i$ can occupy dissimilar geometric regions with respect to one another. For example, the one or more of the three-dimensional slices 204.1 through 204.$i$ can include a similar number of pixels of the three-dimensional media plane 202 with respect to one another and/or one or more of the three-dimensional slices 204.1 through 204.$i$ can occupy dissimilar number of pixels of the three-dimensional media plane 202 with respect to one another. As described above, the three-dimensional media plane 202 can include a series of rows and a series of columns of pixels. In some embodiments, each three-dimensional slice from among the three-dimensional slices 204.1 through 204.$i$ can extend along one or more rows from among the series of rows and/or one or more columns from among the series of columns of the pixels of the three-dimensional media plane 202 as illustrated in FIG. 2A. In these embodiments, one or more of the three-dimensional slices from among the three-dimensional slices 204.1 through 204.$i$ can extend along one or more columns from a top, or a crown, of the three-dimensional media plane 202 to a bottom, or a springing, of the three-dimensional media plane 202 along the series of rows of the pixels of the three-dimensional media plane 202. In these embodiments, one or more of the three-dimensional slices from among the three-dimensional slices 204.1 through 204.$i$ can extend along one or more rows from among the series of rows across the interior, or intrados, of the three-dimensional media plane 202 along the series of columns of the pixels of the three-dimensional media plane 202.

After the three-dimensional media plane 202 is logically segmented into the three-dimensional slices 204.1 through 204.$i$ of the three-dimensional media plane 202, the three-dimensional slices 204.1 through 204.$i$ can be assigned to the image processing servers 206.1 through 206.$i$. The image processing servers 206.1 through 206.$i$ as illustrated in FIG. 2A can represent exemplary embodiments of the image processing servers 104.1 through 104.$i$ as described above in FIG. 1. As illustrated in FIG. 2A, one or more processing servers from among the image processing servers 206.1 through 206.$i$ can be assigned to one or more corresponding three-dimensional slices from among the three-dimensional slices 204.1 through 204.$i$. For example, a processing server from among the image processing servers 206.1 through 206.$i$ can be assigned to a single three-dimensional slice from among the three-dimensional slices 204.1 through 204.$i$. As another example, a processing server from among the image processing servers 206.1 through 206.$i$ can be assigned to multiple three-dimensional slices from among the three-dimensional slices 204.1 through 204.$i$.

As illustrated in FIG. 2B, a two-dimensional image 208 that is to be projected onto the three-dimensional media plane 202 can be logically segmented into two-dimensional slices 210.1 through 210.$i$ of the two-dimensional image 208. In some embodiments, the two-dimensional slices 210.1 through 210.$i$ can occupy arbitrary geometric regions, for example, rectangular shapes, of pixels of the two-dimensional image 208. In these embodiments, the arbitrary geometric regions can include closed geometric regions, such as regular curves; such as circles or ellipses, irregular curves; regular polygons, such as equilateral triangles or squares, and/or irregular polygons, such as rectangles and/or parallelograms to provide some examples. In these embodiments, one or more of the two-dimensional slices 210.1 through 210.$i$ can occupy similar geometric regions with respect to one another and/or one or more of the two-dimensional slices 210.1 through 210.$i$ can occupy dissimilar geometric regions with respect to one another. For example, the one or more of the two-dimensional slices 210.1 through 210.$i$ can include a similar number of pixels of the two-dimensional image 208 with respect to one another and/or one or more of the two-dimensional slices 210.1 through 210.$i$ can occupy dissimilar number of pixels of the two-dimensional image 208 with respect to one another.

After the two-dimensional image 208 is logically segmented into the two-dimensional slices 210.1 through 210.$i$, the three-dimensional slices 204.1 through 204.$i$ can be associated with the two-dimensional slices 210.1 through 210.$i$. As illustrated in FIG. 2B, one or more three-dimensional slices from among the three-dimensional slices 204.1 through 204.$i$ can be associated with one or more corresponding two-dimensional slices from among the two-dimensional slices 210.1 through 210.$i$. For example, a three-dimensional slice from among the three-dimensional slices 204.1 through 204.$i$ can be associated with a single two-dimensional slice from among the two-dimensional slices 210.1 through 210.$i$. As another example, a three-dimensional slice from among the three-dimensional slices 204.1 through 204.$i$ can be associated with multiple two-dimensional slices from among the two-dimensional slices 210.1 through 210.$i$.

After the three-dimensional slices 204.1 through 204.$i$ are assigned to the image processing servers 206.1 through 206.$i$ and the three-dimensional slices 204.1 through 204.$i$ associated with the two-dimensional slices 210.1 through 210.$i$ of the image 208, the image processing servers 206.1 through 206.$i$ can mathematically transform the two-dimensional slices 210.1 through 210.$i$ into the three-dimensional slices 204.1 through 204.$i$ of the three-dimensional media plane 202 to enable the image 202 to be projected onto the three-dimensional media plane 202 of the venue 200 as to be described in further detail below. As to be described in further detail below, the image processing servers 206.1 through 206.$i$ can implement the kernel-based sampling technique as described above in FIG. 1 to project the pixels of the three-dimensional slices 204.1 through 204.$i$ of the three-dimensional media plane 202 onto a two-dimensional image space of the two-dimensional slices 210.1 through 210.$i$ of the image 208 to effectively transform the pixels of the three-dimensional slices 204.1 through 204.$i$ of the three-dimensional media plane 202 into two-dimensional coordinates of two-dimensional points that are projected onto the two-dimensional slices 210.1 through 210.$i$ of the image 208. In some embodiments, the kernel-based sampling technique can statistically interpolate the color information of the pixels of the three-dimensional slices 204.1 through 204.$i$ of the three-dimensional media plane 202 based upon color information of the two-dimensional slices 210.1 through 210.$i$ of the image 208. In these embodiments, the kernel-based sampling technique can statistically interpolate the color information of the pixels of the three-dimensional slices 204.1 through 204.$i$ of the three-dimensional media plane 202 by weighing and accumulating the color information of pixels of the two-dimensional slices 210.1 through 210.$i$ of the image 208 that are nearby the two-dimensional points that are projected on the two-dimensional slices 210.1 through 210.$i$ of the image 208.

Figure 3A:
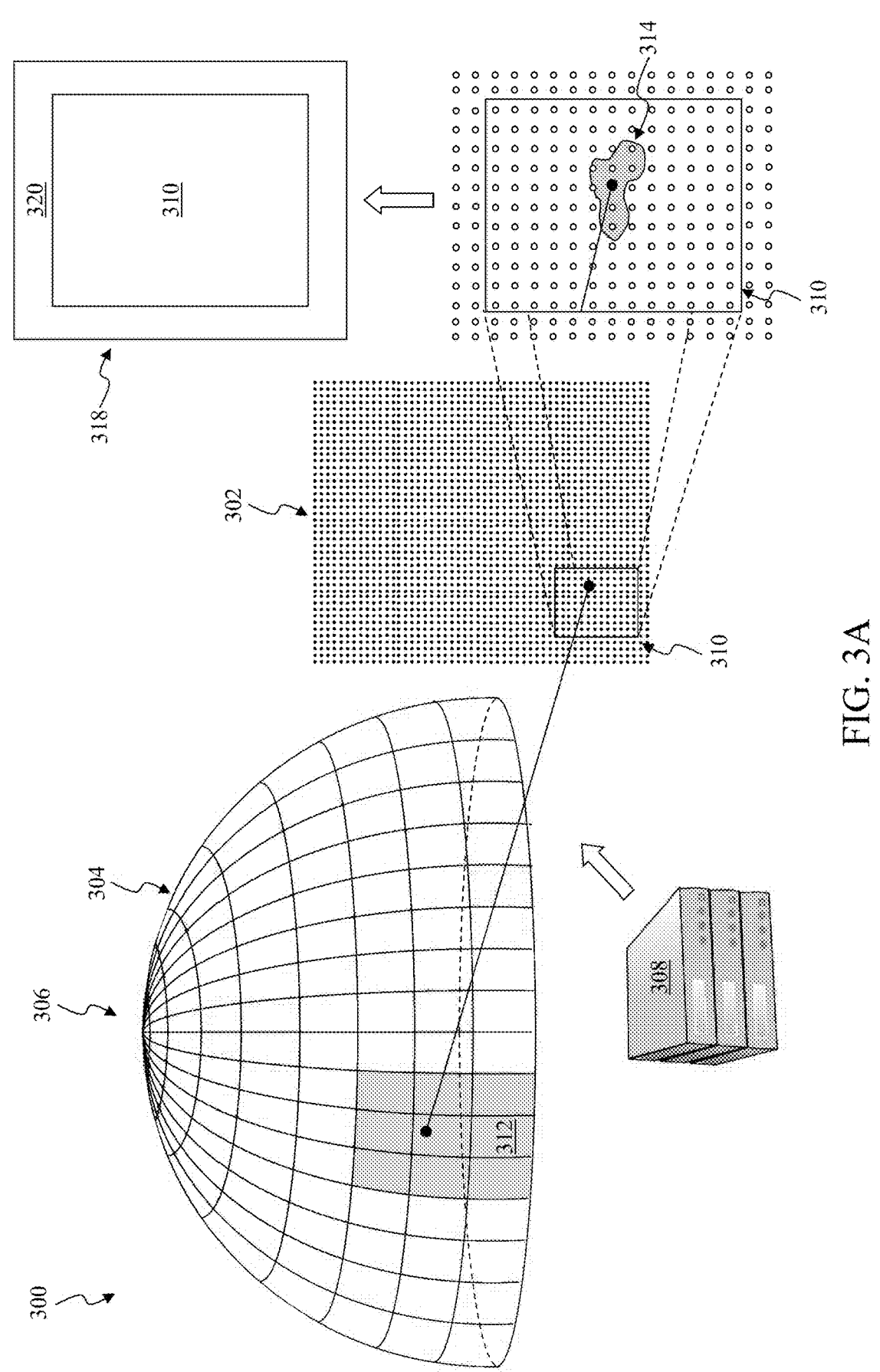
FIG. 3A and FIG. 3B illustrate the exemplary kernel-based sampling technique that can be implemented within the exemplary projection system according to some exemplary embodiments of the present disclosure.
Figure 3B:
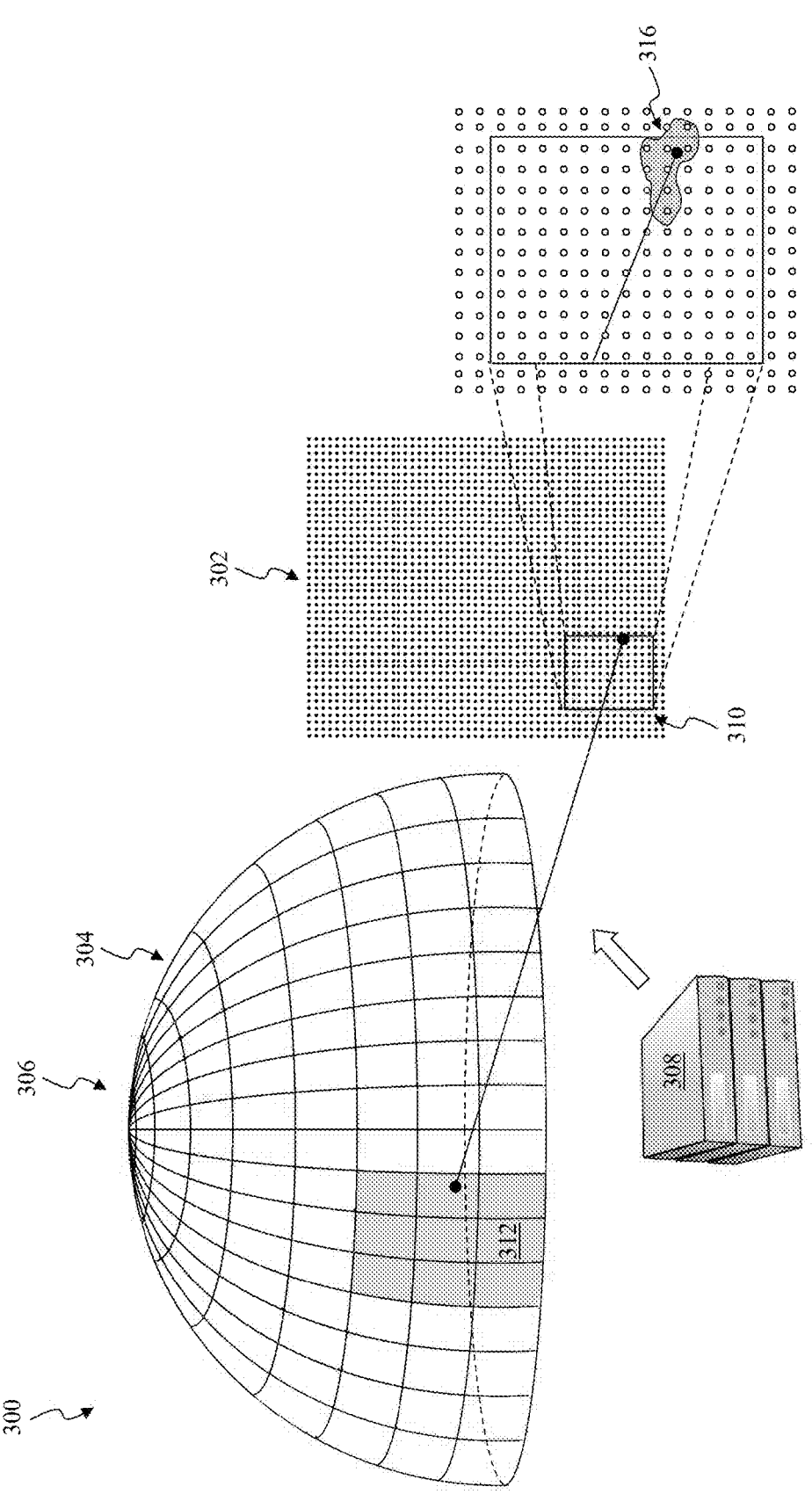

Exemplary Kernel-Based Sampling Techniques that can be Implemented within the Exemplary Image Projection System FIG. 3A and FIG. 3B illustrate the exemplary kernel-based sampling technique that can be implemented within the exemplary projection system according to some exemplary embodiments of the present disclosure. The discussion of FIG. 3A and FIG. 3B to follow is to further describe the kernel-based sampling technique as described above in FIG. 1, FIG. 2A, and/or FIG. 2B. In the exemplary embodiments illustrated in FIG. 3A and FIG. 3B, a kernel-based sampling technique 300 mathematically transforms two-dimensional coordinates of an image 302 onto three-dimensional coordinates of a three-dimensional media plane 304 of a venue 306. The kernel-based sampling technique 300, when executed by an image processing server 308, can mathematically transform two-dimensional coordinates of pixels of a two-dimensional slice 310 of the image 302 onto pixels of a three-dimensional slice 312 of the three-dimensional media plane 304 as to be described in further detail below. In some embodiments, the image processing server 308 can represent an exemplary embodiment of one or more of the image processing servers 104.1 through 104.$i$ as described above in FIG. 1 and/or one or more of the image processing servers 206.1 through 206.$i$ as described above in FIG. 2A and FIG. 2B. And the venue 306 can represent an exemplary embodiment of the venue 106 as described above in FIG. 1, and/or venue 200 as described above in FIG. 2A and/or FIG. 2B.

In the exemplary embodiments illustrated in FIG. 3A and FIG. 3B, the image processing server 308 can be assigned to one or more three-dimensional slices, such as the three-dimensional slice 312 to provide an example, of the three-dimensional media plane 304 in a substantially similar manner as described above in FIG. 1 and/or FIG. 2A. And the three-dimensional slice 312 can be associated with one or more two-dimensional slices, such as the two-dimensional slice 310 to provide an example, of the image 302 in a substantially similar manner as described above in FIG. 1 and/or FIG. 2B. After the image processing server 308 is assigned to the three-dimensional slice 312 which is associated with the two-dimensional slice 310, the kernel-based sampling technique 300 can mathematically transform two-dimensional coordinates of the two-dimensional slice 310 into three-dimensional coordinates of the three-dimensional slice 312 to enable the image 302 to be projected onto the three-dimensional media plane 304. As illustrated in FIG. 3A and FIG. 3B, the kernel-based sampling technique 300 can project the pixels of the three-dimensional slice 312 onto a two-dimensional space of the two-dimensional slice 310 to effectively transform the pixels into two-dimensional points that are projected onto the two-dimensional space of the two-dimensional slice 310.

After projecting the pixels of the three-dimensional slice 312, the kernel-based sampling technique 300 statistically interpolates color information for example, luminance and/or chrominance components of YUV color model and/or red, green, and/or blue components of a RGB color model to provide some examples, of the pixels of the three-dimensional slice 312 from the pixels of the two-dimensional slice 310. In some embodiments, the kernel-based sampling technique 300 can statistically interpolate the color information of pixels of the three-dimensional slice 312 based upon color information of the pixels of the two-dimensional slice 310. In these embodiments, the kernel-based sampling technique 300 can statistically interpolate the color information of the pixels of the three-dimensional slice 312 by weighing and accumulating the color information of the pixels of the two-dimensional slice 310 that are nearby the two-dimensional points that are projected onto the two-dimensional space of the two-dimensional slice 310.

As illustrated in FIG. 3A and FIG. 3B, the kernel-based sampling technique 300 can weigh the color information of the pixels of the two-dimensional slice 310 that are nearby the two-dimensional points that are projected onto the two-dimensional space of the two-dimensional slice 310. In some embodiments, the kernel-based sampling technique 300 can identify the pixels of the two-dimensional slice 310 that are nearby the two-dimensional points that are projected onto the two-dimensional space of the two-dimensional slice 310. In these embodiments, the pixels of the two-dimensional slice 310 that are nearby these two-dimensional points can be situated within a region of interest (ROIs), also referred to as a sampling kernel space 314 as illustrated in FIG. 3A and/or a sampling kernel space 316 as illustrated in FIG. 3B, within the two-dimensional slice 310. Generally, the sampling kernel space 314 and/or the sampling kernel space 316 can be arbitrary geometric regions within the two-dimensional slice 310 that include one or more pixels from among the pixels of the two-dimensional slice 310 that will be apparent to those skilled in the relevant art(s) without departing from the spirit and scope of the present disclosure. In some embodiments, the arbitrary geometric regions can include closed geometric regions, such as regular curves; such as circles or ellipses, irregular curves; regular polygons, such as equilateral triangles or squares, and/or irregular polygons, such as rectangles and/or parallelograms to provide some examples. Alternatively, or in addition to, the arbitrary geometric regions can be related to one or more mathematical functions such as an Ackley function, a Himmelblau function, a Rastrigin function, a Rosenbrock function, also known as Rosenbrock's banana function, and/or a Shekel function to provide some examples.

In the exemplary embodiment illustrated in FIG. 3A and FIG. 3B, the kernel-based sampling technique 300 can weigh pixels of a statistical interpolation region 318 within the sampling kernel space 314 and/or the sampling kernel space 316 that are nearby the two-dimensional points that are projected onto the two-dimensional space of the two-dimensional slice 310. In some embodiments, the kernel-based sampling technique 300 can implement one or more digital image processing techniques, such as a digital image crop technique to provide an example, to generate a statistical interpolation region 318 for statistically interpolating the color information of the pixels of the three-dimensional slice 312. In these embodiments, the statistical interpolation region 318 includes a first region pixels of the two-dimensional slice 310 and a second region of pixels of other two-dimensional slices 320 that are associated with other three-dimensional slices of the three-dimensional media plane that assigned to other image processing servers. In some embodiments, the pixels of other two-dimensional slices 320 can include one or more rows and/or columns of pixels that surround a periphery of, namely, are adjacent to, the two-dimensional slice 310 and/or associated with the other three-dimensional slices of the three-dimensional media plane that assigned to the other image processing servers. In these embodiments, the pixels of other two-dimensional slices 320 can include between five (5) and two hundred (200) rows and/or columns of pixels depending upon the shape of the sampling kernel space 314 and/or the sampling kernel space 316. As illustrated in FIG. 3A, the digital image crop technique can isolate the two-dimensional slice 310 and the pixels of other two-dimensional slices 320 from the image 302 to generate the statistical interpolation region 318. In the exemplary embodiment illustrated in FIG. 3A, the pixels within the sampling kernel space 314 that are nearby the two-dimensional points that are projected onto the two-dimensional space of the two-dimensional slice 310 are within the two-dimensional slice 310. As such, the kernel-based sampling technique 300 can statistically interpolate the color information of the pixels of the three-dimensional slice 312 from the pixels of the two-dimensional slice 310. However, as illustrated in FIG. 3B, the pixels within the sampling kernel space 316 that are nearby the two-dimensional points that are projected onto the two-dimensional space of the two-dimensional slice 310 are within the two-dimensional slice 310 and the pixels of the other two-dimensional slices 320. As such, the kernel-based sampling technique 300 can statistically interpolate the color information of the pixels of the three-dimensional slice 312 from the pixels of the two-dimensional slice 310 and the pixels of the other two-dimensional slices 320.

After identifying the pixels of the statistical interpolation region 318 within the sampling kernel space 314 and/or the sampling kernel space 316, the kernel-based sampling technique 300 can weigh the color information, for example, luminance and/or chrominance components of YUV color model and/or red, green, and/or blue components of a RGB color model to provide some examples, of these pixels. In some embodiments, the weighing can be a distance-based weighing of the color information of the pixels of the statistical interpolation region 318 within the sampling kernel space 314 and/or the sampling kernel space 316. For example, the pixels of the statistical interpolation region 318 within the sampling kernel space 314 and/or the sampling kernel space 316 that are closer to the two-dimensional points that are projected onto the two-dimensional space of the two-dimensional slice 310 are weighted more than the pixels of the statistical interpolation region 318 within the sampling kernel space 314 and/or the sampling kernel space 316 that are further from the two-dimensional points that are projected onto the two-dimensional space of the two-dimensional slice 310. In some embodiments, if the distances between the pixels of the statistical interpolation region 318 within the sampling kernel space 314 and/or the sampling kernel space 316 and the two-dimensional points that are projected onto the two-dimensional space of the two-dimensional slice 310 can be considered to be a random variable, the kernel-based sampling technique 300 can weigh the pixels of the statistical interpolation region 318 within the sampling kernel space 314 and/or the sampling kernel space 316 in accordance with a probably density function, such as a Gaussian distribution, a Normal Distribution, a Standard Normal Distribution, a Student-t Distribution, a, Chi-Square Distribution, a Continuous Uniform Distribution and/or any other well-known probably density function that will be apparent to those skilled in the relevant art(s) without departing from the spirit and scope of the present disclosure.

Once the color information of the pixels of the statistical interpolation region 318 within the sampling kernel space 314 and/or the sampling kernel space 316 has been weighted, the kernel-based sampling technique 300 can accumulate the weighted color information of these pixels to statistically interpolate the color information of the pixels of the three-dimensional slice 312. In the exemplary embodiments illustrated in FIG. 3A and FIG. 3B, the kernel-based sampling technique 300 can accumulate the color information of the color information of the pixels of the statistical interpolation region 318 within the sampling kernel space 314 and/or the sampling kernel space 316 that has been weighted as described above to statistically interpolate the color information of the pixels of the three-dimensional slice 312 In these embodiments, the kernel-based sampling technique 300 can associate the two-dimensional points that are projected onto the two-dimensional space of the two-dimensional slice 310 with their corresponding pixels from among the pixels of the pixels of the three-dimensional slice 312. Thereafter, the kernel-based sampling technique 300 can associate the color information of the two-dimensional points that are projected onto the two-dimensional space of the two-dimensional slice 310 to their corresponding pixels from among the pixels of the three-dimensional slice 312 to statistically interpolate the color information of the pixels of the three-dimensional slice 312. In some embodiments, the kernel-based sampling technique 300 can generate quadruples for the three-dimensional slice 312 that include the pixels of the three-dimensional slice 312$n$ and the color information for the pixels of the three-dimensional slice 312 has been statistically interpolated from the statistical interpolation region 318.

Figure 4:
FIG. 4 illustrates a flowchart of an exemplary kernel-based sampling technique that can be implemented within the exemplary image projection system according to some exemplary embodiments of the present disclosure.
Figure 4:
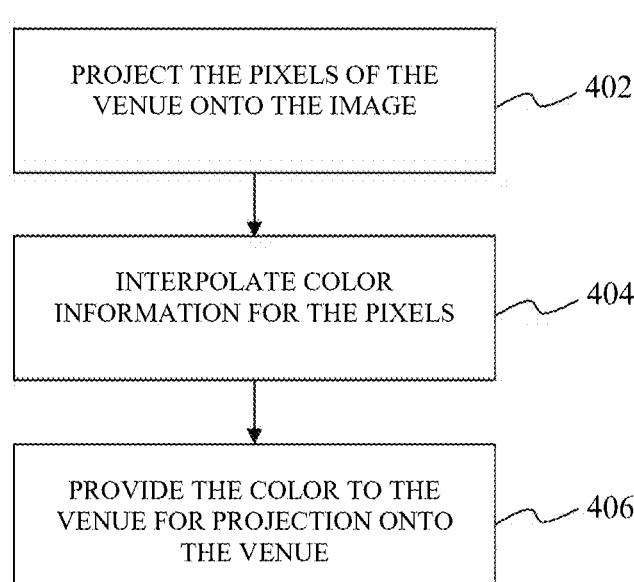

FIG. 4 illustrates a flowchart of an exemplary kernel-based sampling technique that can be implemented within the exemplary image projection system according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for mathematically transforming two-dimensional coordinates of pixels of a slice of an image onto three-dimensional coordinates of a slice of a three-dimensional media plane of a venue, such as the venue 106 as described above in FIG. 1, the venue 200 as described above in FIG. 2A and FIG. 2B, and/or the venue 306 as described above in FIG. 3A and FIG. 3B. The operational control flow 400 can be executed by one or more computer systems, such as one or more of the image processing servers 104.1 through 104.$i$ as described above in FIG. 1, the image processing servers 206.1 through 206.$i$ as described above in FIG. 2A and FIG. 2B, and/or the image processing server 308 as described above in FIG. 3A and FIG. 3B.

At operation 402, the operational control flow 400 projects the pixels of a three-dimensional slice of the three-dimensional media plane onto a two-dimensional slice of a two-dimensional image to effectively transform the pixels of the three-dimensional slice of the three-dimensional media plane into two-dimensional coordinates of two-dimensional points that are projected on the two-dimensional image. In some embodiments, the operational control flow 400 can logically segment the three-dimensional media plane into multiple three-dimensional slices of the three-dimensional media plane. In these embodiments, the three-dimensional slice of the three-dimensional media plane can represent one or more three-dimensional slices of the three-dimensional media plane from among the multiple three-dimensional slices of the three-dimensional media plane in a substantially similar manner as described above in FIG. 2A. In some embodiments, the operational control flow 400 can logically segment the two-dimensional image into multiple two-dimensional slices of the two-dimensional image. In these embodiments, the two-dimensional slice of the two-dimensional image can represent one or more two-dimensional slices of the two-dimensional images from among the multiple two-dimensional images in a substantially similar manner as described above in FIG. 2B.

At operation 404, the operational control flow 400 statistically interpolates color information, for example, luminance and/or chrominance components of YUV color model and/or red, green, and/or blue components of a RGB color model to provide some examples, of the pixels of the three-dimensional slice of the three-dimensional media plane from operation 402 from the pixels of a statistical interpolation region of the two-dimensional image. In some embodiments, the statistical interpolation region can include the pixels of the two-dimensional slice of the two-dimensional image from operation 402 and pixels from other two-dimensional slices of the two-dimensional image from among the multiple two-dimensional slices of the two-dimensional image from operation 402 as described above in FIG. 3A and FIG. 3B. In some embodiments, the operational control flow 400 can statistically interpolate the color information of the pixels of the three-dimensional slice of the three-dimensional media plane from operation 402 based upon color information of the pixels of the statistical interpolation region. In these embodiments, the operational control flow 400 can statistically interpolate the color information of the pixels of the three-dimensional slice of the three-dimensional media plane from operation 402 by weighing and accumulating the color information of the pixels of the statistical interpolation region that are nearby the two-dimensional points that are projected on the image from operation 402 in a substantially similar manner as described above in FIG. 3A and FIG. 3B.

At operation 406, the operational control flow 400 provides the color information of the pixels to the venue for projection onto the venue in a substantially similar manner as described above in FIG. 1, FIG. 2A, FIG. 2B, FIG. 3A and/or FIG. 3B.

Figure 5:
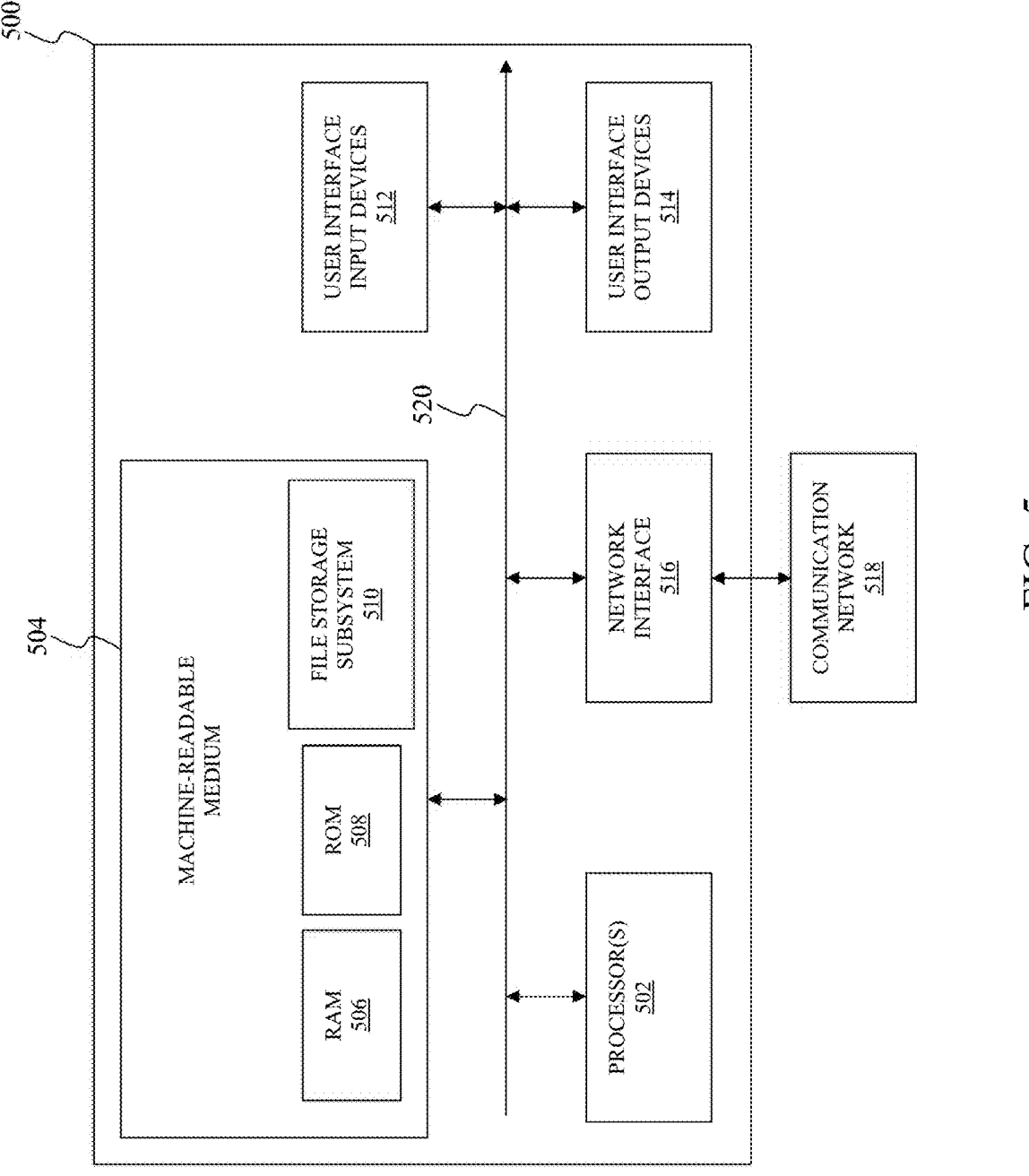
FIG. 5 graphically illustrates a simplified block diagram of a computer system for executing the electronic design platform according to some embodiments of the present disclosure.

Exemplary Computer System that can be Implemented within the Exemplary Image Projection System FIG. 5 graphically illustrates a simplified block diagram of a computer system for executing the electronic design platform according to some embodiments of the present disclosure. As described above, one or more electronic design software tools can be executed by one or more computing devices, processors, controllers, or other electrical, mechanical, and/or electro-mechanical devices that will be apparent to those skilled in the relevant art(s) without departing from the spirit and the scope of the present disclosure, to design, simulate, analyze, and/or verify architectural design layout of electronic circuitry for an electronic device. The discussion of FIG. 5 to follow is to describe a computer system 500 that can be implemented within the image projection system 100 as described above in FIG. 1.

In the embodiment illustrated in FIG. 5, the computer system 500 includes one or more processors 502 to execute the one or more electronic design software tools as described above in FIG. 1. In some embodiments, the one or more processors 502 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).) In some embodiments, the computer system 500 can include an operating system, such as Microsoft's Windows, Sun Microsystems's Solaris, Apple Computer's MacOs, Linux or UNIX. In some embodiments, the computer system 500 can also include a Basic Input/Output System (BIOS) and processor firmware. The operating system, BIOS and firmware are used by the one or more processors 502 to control subsystems and interfaces coupled to the one or more processors 502. In some embodiments, the one or more processors 502 can include the Pentium and Itanium from Intel, the Opteron and Athlon from Advanced Micro Devices, and the ARM processor from ARM Holdings.

As illustrated in FIG. 5, the computer system 500 can include a machine-readable medium 504. In some embodiments, the machine-readable medium 504 can further include a main random-access memory ("RAM") 506, a read only memory ("ROM") 508, and/or a file storage subsystem 510. The RAM 530 can store instructions and data during program execution and the ROM 532 can store fixed instructions. The file storage subsystem 510 provides persistent storage for program and data files, and may include a hard disk drive, a floppy disk drive along with associated removable media, a CD-ROM drive, an optical drive, a flash memory, or removable media cartridges.

The computer system 500 can further include user interface input devices 512 and user interface output devices 514. The user interface input devices 512 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 512 can be connected by wire or wirelessly to the computer system 500. Generally, the user interface input devices 512 are intended to include all possible types of devices and ways to input information into the computer system 500. The user interface input devices 512 typically allow a user to identify objects, icons, text and the like that appear on some types of user interface output devices, for example, a display subsystem. The user interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. Generally, the user interface output devices 520 are intended to include all possible types of devices and ways to output information from the computer system 500.

The computer system 500 can further include a network interface 516 to provide an interface to outside networks, including an interface to a communication network 518, and is coupled via the communication network 518 to corresponding interface devices in other computer systems or machines. The communication network 518 may comprise many interconnected computer systems, machines and communication links. These communication links may be wired links, optical links, wireless links, or any other devices for communication of information. The communication network 518 can be any suitable computer network, for example a wide area network such as the Internet, and/or a local area network such as Ethernet. The communication network 518 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 5, the one or more processors 502, the machine-readable medium 504, the user interface input devices 512, the user interface output devices 514, and/or the network interface 516 can be communicatively coupled to one another using a bus subsystem 520. Although the bus subsystem 520 is shown schematically as a single bus, alternative embodiments of the bus subsystem may use multiple busses. For example, RAM-based main memory can communicate directly with file storage systems using Direct Memory Access ("DMA") systems.

<div align="center">CONCLUSION</div>

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. An image processing server from among a plurality of image processors for transforming an image for projection onto a media plane of a venue, the image processor comprising:

a memory configured to store instructions; and a processor, configured to execute the instructions, the instructions, when executed by the processor, configuring the processor to:

retrieve a two-dimensional slice of the image that is associated with a three-dimensional slice of the media plane from among a plurality of two-dimensional slices of the image, the three-dimensional slice being assigned to the image processing server from among a plurality of three-dimensional slices of the media plane that are distributable among the plurality of image processors, project three-dimensional coordinates of a plurality of pixels of the three-dimensional slice of the media plane, onto two-dimensional coordinates of the two-dimensional slice of the image that to provide a plurality of two-dimensional points, interpolate color information of the plurality of pixels of the three-dimensional slice of the media plane at the plurality of two-dimensional points based upon color information of a first plurality of pixels within the two-dimensional slice of the image or a second plurality of pixels of the image that surround the two-dimensional slice, and provide the color information of the plurality of pixels of the three-dimensional slice of the media plane to the media plane to project the two-dimensional slice of the image onto the media plane.

2. The image processing server of claim 1, wherein the instructions, when executed by the processor, further configure the processor to:

logically segment the media plane into the plurality of three-dimensional slices of the media plane; and assign each three-dimensional slice of the media plane from among the plurality of three-dimensional slices of the media plane to a corresponding image processing server from among the plurality of image processing servers.

3. The image processing server of claim 2, wherein the instructions, when executed by the processor, further configure the processor to:

logically segment the image into the plurality of two-dimensional slices of the image; and associate each two-dimensional slice from among the plurality of two-dimensional slices of the image with a corresponding three-dimensional slice of the media plane from among the plurality of three-dimensional slices of the media plane.

4. The image processing server of claim 1, wherein the instructions, when executed by the processor, further configure the processor to crop the image to generate a statistical interpolation region of the image, the statistical interpolation region being defined relative to the plurality of two-dimensional points and including the first plurality of pixels and the second plurality of pixels.

5. The image processing server of claim 1, wherein the second plurality of pixels is within a second two-dimensional slice of the image from among the plurality of two-dimensional slices of the image that is associated with a second three-dimensional slice of the media plane from among the plurality of three-dimensional slices of the media plane that is assigned to a second image processing server from among a plurality of image processing servers.

6. The image processing server of claim 1, wherein instructions, when executed by the processor, configure the processor to interpolate the color information of the plurality of pixels of the three-dimensional slice of the media plane by weighing and accumulating the color information of the first plurality of pixels or the second plurality of pixels that are situated within a sample kernel space defined relative to the plurality of two-dimensional points.

7. The image processing server of claim 6, wherein the instructions, when executed by the processor, configure the processor to weigh the color information of the first plurality of pixels or the second plurality of pixels that are situated within the sample kernel space in accordance with a probability density function.

8. A method for operating an image processing server from among a plurality of image processors to transform an image for projection onto a media plane of a venue, the method comprising:

assigning a three-dimensional slice of the media plane to the image processing server from among a plurality of three-dimensional slices of the media plane that are distributed among the plurality of image processors;

retrieving, by the image processing server, a two-dimensional slice of the image that is associated with a three-dimensional slice of the media plane from among a plurality of two-dimensional slices of the image, the three-dimensional slice being assigned to the image processing server from among a plurality of three-dimensional slices of the media plane that are distributed among the plurality of image processors, projecting, by the image processing server, three-dimensional coordinates of a plurality of pixels of the three-dimensional slice of the media plane onto two-dimensional coordinates of the two-dimensional slice of the image to provide a plurality of two-dimensional points;

interpolating, by the image processing server, color information of the plurality of pixels of the three-dimensional slice of the media plane at the plurality of two-dimensional points based upon color information of a first plurality of pixels within the two-dimensional slice of the image that is associated with the three-dimensional slice of the media plane or a second plurality of pixels of the image that surround the two-dimensional slice; and providing, by the image processing server, the color information of the plurality of pixels of the three-dimensional slice of the media plane to the media plane to project the two-dimensional slice of the image onto the media plane.

9. The method of claim 8, wherein the assigning comprises:

logically segmenting the media plane into the plurality of three-dimensional slices of the media plane; and assigning each three-dimensional slice of the media plane from among the plurality of three-dimensional slices of the media plane to a corresponding image processing server from among the plurality of image processing servers.

10. The method of claim 9, wherein the assigning further comprises:

logically segmenting the image into the plurality of two-dimensional slices of the image, and associating each two-dimensional slice from among the plurality of two-dimensional slices of the image with a corresponding three-dimensional slice of the media plane from among the plurality of three-dimensional slices of the media plane.

11. The method of claim 8, wherein the interpolating comprises cropping the image to generate a statistical interpolation region of the image, the statistical interpolation region being defined relative to the plurality of two-dimensional points and including the first plurality of pixels and the second plurality of pixels.

12. The method of claim 8, wherein the second plurality of pixels is within a second two-dimensional slice of the image from among the plurality of two-dimensional slices of the image that is associated with a second three-dimensional slice of the media plane from among the plurality of three-dimensional slices of the media plane that is assigned to a second image processing server from among a plurality of image processing servers.

13. The method of claim 8, wherein the interpolating comprises interpolating the color information of the plurality of pixels of the three-dimensional slice of the media plane by weighing and accumulating the color information of the first plurality of pixels or the second plurality of pixels that are situated within a sample kernel space defined relative to the plurality of two-dimensional points.

14. The method of claim 13, wherein the interpolating further comprises weighing the color information of the first plurality of pixels or the second plurality of pixels that are situated within the sample kernel space in accordance with a probability density function.

15. A system image projection system for transforming an image for projection onto a media plane of a venue, the system comprising:

a first image processing server from among a plurality of image processing servers, the first image processing server being configured to:

retrieve a first two-dimensional slice of the image from among a plurality of two-dimensional slices of the image, the first two-dimensional slice of the image being associated with a first three-dimensional slice of the media plane that is assigned to the first image processing server from among a plurality of three-dimensional slices of the media plane, project three-dimensional coordinates of a plurality of pixels of the first three-dimensional slice of the media plane onto two-dimensional coordinates of the first two-dimensional slice of the image to provide a first plurality of two-dimensional points, interpolate color information of the plurality of pixels of the first three-dimensional slice of the media plane at the first plurality of two-dimensional points based upon color information of a first plurality of pixels within the first two-dimensional slice of the image that is associated with the first three-dimensional slice of the media plane and color information of a second plurality of pixels of the image that surround the first two-dimensional slice, and provide the color information of the plurality of pixels of the first three-dimensional slice of the media plane to the media plane to project the first two-dimensional slice of the image onto the media plane; and a second image processing server from among a plurality of image processing servers, the second image processing server being configured to:

retrieve a second two-dimensional slice of the image from among the plurality of two-dimensional slices of the image, the second two-dimensional slice of the image being associated with a second three-dimensional slice of the media plane that is assigned to the second image processing server from among the plurality of three-dimensional slices of the media plane, project three-dimensional coordinates of a plurality of pixels of the second three-dimensional slice of the media plane onto two-dimensional coordinates of the second two-dimensional slice of the image to provide a second plurality of two-dimensional points, interpolate color information of the plurality of pixels of the second three-dimensional slice of the media plane at the second plurality of two-dimensional points based upon color information of a third plurality of pixels within the second two-dimensional slice of the image that is associated with the second three-dimensional slice of the media plane and color information of a fourth plurality of pixels of the image that surround the second two-dimensional slice, and provide the color information of the plurality of pixels of the second three-dimensional slice of the media plane to the media plane to project the second two-dimensional slice of the image onto the media plane.

16. The system of claim 15, wherein the first image processing server is further configured to:

logically segment the media plane into the plurality of three-dimensional slices of the media plane; and assign the second three-dimensional slice of the media plane to the second image processing server.

17. The system of claim 16, wherein the first image processing server is further configured to:

logically segment the image into the plurality of two-dimensional slices of the image; and associate the second two-dimensional slice of the image with the second three-dimensional slice of the media plane.

18. The system of claim 15, wherein the first image processing server is further configured to crop the image to generate a statistical interpolation region of the image, the statistical interpolation region being defined relative to the plurality of two-dimensional points and including the first plurality of pixels or the second plurality of pixels.

19. The system of claim 15, wherein the second plurality of pixels is within the second two-dimensional slice of the image.

20. The system of claim 15, wherein the first image processing server is further configured to interpolate the color information of the plurality of pixels of the first three-dimensional slice of the media plane by weighing and accumulating the color information of the first plurality of pixels or the second plurality of pixels that are situated within a sample kernel space defined relative to the first plurality of two-dimensional points.

* * * * *